(12) United States Patent
Boucadair et al.

(10) Patent No.: US 12,255,876 B2
(45) Date of Patent: Mar. 18, 2025

(54) METHOD FOR MANAGING COMMUNICATION BETWEEN TERMINALS IN A COMMUNICATION NETWORK, AND DEVICES FOR IMPLEMENTING THE METHOD

(71) Applicant: Orange, Issy-les-Moulineaux (FR)

(72) Inventors: Mohamed Boucadair, Chatillon (FR); Christian Jacquenet, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 415 days.

(21) Appl. No.: 17/597,179

(22) PCT Filed: Jun. 22, 2020

(86) PCT No.: PCT/FR2020/051080
§ 371 (c)(1),
(2) Date: Dec. 28, 2021

(87) PCT Pub. No.: WO2020/260813
PCT Pub. Date: Dec. 30, 2020

(65) Prior Publication Data
US 2022/0311746 A1     Sep. 29, 2022

(30) Foreign Application Priority Data

Jun. 28, 2019 (FR) .................................. 1907090

(51) Int. Cl.
*H04L 9/00* (2022.01)
*H04L 9/40* (2022.01)
(Continued)

(52) U.S. Cl.
CPC ...... *H04L 63/0281* (2013.01); *H04L 63/0853* (2013.01); *H04L 67/561* (2022.05); *H04L 67/563* (2022.05); *H04L 69/164* (2013.01)

(58) Field of Classification Search
CPC . H04L 69/164; H04L 63/0853; H04L 67/561; H04L 67/563; H04L 63/0281
(Continued)

(56) References Cited

U.S. PATENT DOCUMENTS 10,868,766 B2 * 12/2020 di Proietto .......... H04L 47/2441
2009/0279553 A1 * 11/2009 Horu ..................... H04W 40/20
370/400

(Continued)

FOREIGN PATENT DOCUMENTS

WO   WO-2017148509 A1 *  9/2017  ......... H04L 63/0281
WO   WO-2018076183 A1 *  5/2018  ............. H04L 29/06
(Continued)

OTHER PUBLICATIONS

Boucadair, M., Jacquenet, C., Behaghel, D., Secci, S., Henderickx, W., Skog, R., Bonaventure, O., Vinapamula, S., and S. Seo, "*An MPTCP Option for Network-Assisted MPTCP Deployments: Plain Transport Mode*", draft-boucadair-mptcp-plain-mode-08, Jul. 2016.
(Continued)

*Primary Examiner* — Josnel Jeudy
(74) *Attorney, Agent, or Firm* — Knobbe, Martens, Olson & Bear, LLP

(57) ABSTRACT

A method for managing communication between a first terminal and a second terminal in a communication network is disclosed. The method includes, at the first terminal: discovering at least one proxy node between the first terminal and the second terminal, the proxy node being capable of providing at least one service for the communication, and if the first terminal accepts the service, sending to the second terminal, in an establishment phase or during the communication, an encrypted proxy information message contain-
(Continued)

ing data identifying the at least one proxy node and a token intended to be provided to the second terminal by the at least one proxy node.

14 Claims, 7 Drawing Sheets

(51) Int. Cl.
  *H04L 67/561* (2022.01)
  *H04L 67/563* (2022.01)
  *H04L 69/164* (2022.01)
(58) Field of Classification Search
  USPC .......................................................... 726/6
  See application file for complete search history.

(56) References Cited

U.S. PATENT DOCUMENTS

2020/0186501 A1* 6/2020 Neystadt ................ H04L 63/08
2021/0219137 A1* 7/2021 S Bykampadi ....... H04L 63/166

FOREIGN PATENT DOCUMENTS

WO WO 2018/210428 A1 11/2018
WO WO 2018/234675 A1 12/2018

OTHER PUBLICATIONS

Boucadair, M., Jacquenet, C., Behaghel, D., Secci, S., Henderickx, W., Skog, R., Bonaventure, O., Vinapamula, S., and S. Seo, "*An MPTCP Option for Network-Assisted MPTCP Deployments: Plain Transport Mode*", draft-boucadair-mptcp-plain-mode-10, Mar. 2017.
Boucadair, M., C. Jacquenet, "*Transport Internet: TCP plus performant, plus robuste, plus fiable-Quelques évolutions récentes du protocole TCP*", TE7600 v1, Apr. 2017.
Eastlake 3rd, D., Schiller, J., and S. Crocker, "*Randomness Requirements for Security*", BCP 106, RFC 4086, DOI 10.17487/RFC4086, Jun. 2005.
Ford, A., Raiciu, C., Handley, M., and O. Bonaventure, "*TCP Extensions for Multipath Operation with Multiple Addresses*", RFC 6824, Jan. 2013.
Iyengar, J. and M. Thomson, "*QUIC: A UDP-Based Multiplexed and Secure Transport*", draft-ietf-quic-transport-04 (work in progress), Jun. 2017.
Iyengar, J. and M. Thomson, "*QUIC: A UDP-Based Multiplexed and Secure Transport*", draft-ietf-quic-transport-14 (work in progress), Aug. 2018.
Iyengar, J. and M. Thomson, "*QUIC: A UDP-Based Multiplexed and Secure Transport*", draft-ietf-quic-transport-20, Apr. 2019.
Rescorla, E., "*The Transport Layer Security (TLS) Protocol Version 1.3*", RFC 8446, DOI 10.17487/RFC8446, Aug. 2018.
Ruth, J., Poese, I., Dietzel, C., and O. Hohlfeld, "*A First Look at QUIC in the Wild*", Passive Active Measurements Conference (PAM), 2018.
International Search Report for International Application No. PCT/FR2020/051080 mailed on Oct. 13, 2020.

* cited by examiner

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                         Relay_ID (i)                       ...
+-+-+-+-+-+-+-+-+-+-+-+-+-+-+-+-+-+-+-+-+-+-+-+-+-+-+-+-+-+-+-+-+
|                         Sequence (i)                       ...
+-+-+-+-+-+-+-+-+-+-+-+-+-+-+-+-+-+-+-+-+-+-+-+-+-+-+-+-+-+-+-+-+
|   Length (8) |                                                |
+-+-+-+-+-+-+-+-+         Connection ID (32..144)               +
|                                                             ...
+-+-+-+-+-+-+-+-+-+-+-+-+-+-+-+-+-+-+-+-+-+-+-+-+-+-+-+-+-+-+-+-+
|                                                                |
+                                                                +
|                                                                |
+                  Stateless Reset Token (128)                   +
|                                                                |
+                                                                +
|                                                                |
+-+-+-+-+-+-+-+-+-+-+-+-+-+-+-+-+-+-+-+-+-+-+-+-+-+-+-+-+-+-+-+-+
```

METHOD FOR MANAGING COMMUNICATION BETWEEN TERMINALS IN A COMMUNICATION NETWORK, AND DEVICES FOR IMPLEMENTING THE METHOD

CROSS-REFERENCE TO RELATED APPLICATIONS

This application is filed under 35 U.S.C. § 371 as the U.S. National Phase of Application No. PCT/FR2020/051080 entitled "METHOD FOR MANAGING COMMUNICATION BETWEEN TERMINALS IN A COMMUNICATION NETWORK, AND DEVICES FOR IMPLEMENTING THE METHOD" and filed Jun. 22, 2020, and which claims priority to FR 1907090 filed Jun. 28, 2019, each of which is incorporated by reference in its entirety.

BACKGROUND

Field

This disclosure relates to a method for managing a communication between a first terminal and a second terminal in a communication network, as well as to devices for implementing this method. It applies in particular to the management of communications using the QUIC protocol.

Description of the Related Technology

The recent development of applications that can be used on multi-interface terminals, such as smart phones, has given rise to the emergence of new transport protocols which have been proposed, standardized, and implemented by the Internet community to meet the new needs of applications.

One example is the QUIC protocol described in the draft specification of the Internet Engineering Task Force (IETL) entitled "QUIC: A UDP-Based Multiplexed and Secure Transport". It was originally specified in order to relieve the operating system of the constraints imposed by support for the transport layer. The QUIC protocol is based on the UDP protocol ("User Datagram Protocol") rather than on the TCP protocol ("Transmission Control Protocol"), because it aims to reduce the latency times generally observed during the establishment of TCP connections. The use of UDP also makes it possible to better accommodate the presence of firewalls and NAT (Network Address Translation) functions in the path supporting a QUIC communication.

Unlike the TLS ("Transport Layer Security") protocol which is used to secure TCP connections, QUIC not only encrypts the payload data, but also the connection control information. QUIC information sent unencrypted is limited to the strict minimum. Thus, typically a QUIC packet comprises encrypted payload data ("EP") and unencrypted header data ("Public Header", or "PH"). The header data is organized into three fields: a binary flag field ("F"), a connection identifier field ("CID"), and a packet index field ("Packet Number", or "PN").

A QUIC communication (or connection) offers the possibility of multiplexing different channels ("streams"). Each stream is identified by a unique stream identifier ("stream ID") for the time that the QUIC communication lasts. The least significant bits of the stream identifier indicate the nature of the stream. The first least significant bit indicates the initiator of the stream (client or server), and the second least significant bit is used to distinguish unidirectional streams from bidirectional streams. Note that the QUIC protocol does not impose a limit on the maximum number of streams or on the nature of these streams (unidirectional, bidirectional). In addition, a stream can be established at the initiative of the client or of the server. However, participants in a QUIC communication can restrict the number of streams opened by the remote terminal as well as the volume of data exchanged, using control frames sent for this purpose.

The data exchanged for a stream are encapsulated in a frame called "STREAM". A specific stream is dedicated to the encryption of handshake exchanges and to the negotiation of QUIC options. QUIC signaling integrates information that makes it possible to control congestion and recover lost packets, in a mode of operation comparable to that of TCP. In order to support any change of IP address without having to close a QUIC connection in progress, the QUIC protocol does not rely on transport addresses (source IP address, source port number, destination IP address, destination port number) but on the connection identifier CID. The QUIC draft specification from IETF defines two types of CIDs: Destination CID and Source CID.

In the current state of this draft, the QUIC protocol only supports a connection migration mechanism which allows maintaining a QUIC connection in progress in the event of a change to one of the addresses (or port numbers) of the participants (including changes of addresses allocated by intermediate NAT functions if applicable). Receipt of a message in accordance with a connection in progress is an indication of a connection migration. Thus, a connection migration can consist of changing from one quadruplet {source address, source port, destination address, destination port] to another.

The terminals validate the new address using PATH_CHALLENGE and PATH_RESPONSE frames exchanged between the participants to validate a connection migration. Note that the QUIC draft specification of the IETF considers that only one path is used at a time for a same QUIC connection.

As it stands, the QUIC protocol draft specification does not allow supplying, to terminals wishing to establish a QUIC communication, additional services managed by the communication network used by said terminals and provided by intermediary network elements placed on the path taken by the QUIC communication. However, the presence of such proxy nodes can lead to modifications to the resources used for the QUIC communication and in particular modifications to the addresses and/or port numbers used during the communication. However, such modifications can lead to instability in the QUIC communication. Indeed, as mentioned above, a connection migration mechanism is currently only provided in the QUIC protocol in the event of a change of address(es), and this mechanism requires the remote terminal to verify, for each modification detected, that this modification indeed originates from the other terminal engaged in the QUIC communication. This verification is done by means of requests sent by the remote terminal which, in the presence of proxy node(s) on the path used by the communication, may be rejected or fail.

SUMMARY

The present disclosure improves the situation.

According to a first aspect, a method is proposed for managing a communication established according to the QUIC protocol between a first terminal and a second terminal which are connected via a communication network, the method comprising, at the first terminal: discovering at least one proxy node between the first terminal and the second terminal, said proxy node being capable of providing at least one service for said communication; and if the first terminal accepts said service, sending to the second terminal, in an establishment phase or during said communication, an encrypted proxy information message comprising data identifying said at least one proxy node and a token intended to be provided by said at least one proxy node to the second terminal.

Thus, the proposed method advantageously introduces a scheme for discovering a proxy node within a communication network located in the path of a communication between two terminals, and for discovering the services offered by this proxy node. The proposed scheme also allows the use of such a proxy node by two terminals that are in a communication, for example established according to the procedures of the QUIC protocol on the network. The use of a proxy node within the framework of a QUIC communication opens up the possibility for the terminals of the communication to benefit from services, possibly offered by the proxy node and/or accessible to the terminals through the proxy node, for example such as anti-virus services, covert stream detection, packet inspection (DPI), mitigation of a denial of service attack, etc.

The possibility of involving a proxy node in a communication established between two terminals according to the procedures of the QUIC protocol also allows the network operator to better manage the communication, and in particular the network resources assigned to the communication.

In one or more embodiments, discovering said at least one proxy node comprises receiving a message originating from the proxy node or originating from the second terminal and having passed through said at least one proxy node, comprising an indication of said service provided by said proxy node and an identifier of said proxy node.

In one or more embodiments, the proposed method further comprises: if the first terminal accepts the providing of said service by said proxy node, sending a message intended for the proxy node or intended for the second terminal and passing through said proxy node, comprising an indication intended for said proxy node of the acceptance of said service by the first terminal and a token generated by the first terminal.

In one or more embodiments, the proxy information message further comprises at least one element among: reachability information of the proxy node enabling access to said proxy node, at least one identifier of at least one communication between the first and the second terminal along a path involving the proxy node, and a challenge generated by the first terminal.

In one or more embodiments, the proposed method further comprises: verifying a reliability of the proxy node before accepting said service.

The above schemes advantageously allow a QUIC terminal to control the services offered by a QUIC proxy, and to negotiate the services to be applied for the communications associated with this terminal.

In one or more embodiments, said service comprises access by the proxy node to multiple paths for supporting said communication between the first terminal and the second terminal.

The providing of a traffic distribution service via multiple paths by a proxy node of the network advantageously allows an operator of this network to better control the policies for traffic distribution via multiple paths in the network, as such policies activated by a QUIC terminal may not be optimal for the operator.

This further allows setting up collaboration mechanisms between a QUIC terminal and an operator network for the establishment and management of communications via multiple paths.

In one or more embodiments, said message further comprises an algorithm for distributing the traffic load between said multiple paths, intended to be applied by the proxy node.

In one or more embodiments, the proposed method further comprises: during the establishment of or during said communication between the first and second terminal, indicating to the second terminal that the first terminal supports an extension of the QUIC protocol which allows the establishment of said communication according to the QUIC protocol over multiple paths, even if only one path is locally available at the first terminal.

Indeed, a QUIC terminal does not have visibility concerning the multiple paths available in the network. By means of the proposed method, a QUIC communication can benefit from the resources associated with multiple paths, even if these multiple paths are not visible to either the client or the server. This makes it possible to improve the use of resources in the network, but also to improve the quality of the experience as perceived by the customer (due to the ability to aggregate the bandwidth that can be used by a QUIC communication, for example).

According to another aspect, a method is proposed for managing a communication established according to the QUIC protocol between a first terminal and a second terminal which are connected via a communication network, the method comprising, at the second terminal, in an establishment phase or during said communication: receiving, originating from the first terminal, an encrypted proxy information message comprising a token and data identifying at least one proxy node between the first terminal and second terminal that is capable of providing at least one service for said communication.

In one or more embodiments, the proposed method further comprises: storing, for said communication, said token and a first quadruplet comprising a source address and port number and a destination address and port number of the proxy information message; upon detecting, in a subsequent message in said communication originating from the first terminal, a source address different from the source address of the first quadruplet: verifying with the proxy node whether said subsequent message has passed through the proxy node; and if such is the case, storing, for the communication, a second quadruplet comprising the source address and port number and the destination address and port number of the subsequent message.

In one or more embodiments, the second quadruplet is stored while retaining the first quadruplet.

In one or more embodiments, the proposed method further comprises: during the establishment of or during said communication between the first and second terminal, indicating to the first terminal that the second terminal supports an extension of the QUIC protocol which allows the establishment of communications according to the QUIC protocol over multiple paths, even if only one path is locally available at the second terminal.

In one or more embodiments, the verification comprises: sending a verification request message to the proxy node, comprising the source address of the second quadruplet or a challenge; receiving a response message from the proxy node, comprising a token; verifying that said token received from the proxy node matches the stored token.

In one or more embodiments, the proposed method further comprises: if said tokens match, the use of the second quadruplet by the second terminal for sending encrypted messages to the first terminal.

According to another aspect, a method is proposed for managing a communication established according to the QUIC protocol between a first terminal and a second terminal which are connected via a communication network, the method being implemented by a proxy node of the communication network situated between the first and second terminal and capable of providing at least one service for said communication, said method comprising: inserting, into at least one message intended for the first terminal, originating from the second terminal and passing through said proxy node, data indicating the support by said proxy node for said service, said data comprising an identifier of the proxy node.

In one or more embodiments, said data are comprised in a UDP (User Datagram Protocol) option.

In one or more embodiments, said service comprises access by the proxy node to multiple paths which allow supporting said communication between the first terminal and the second terminal.

In one or more embodiments, said data further comprise at least one among: a service offer identifier, at least one reachability information item of the proxy node enabling access to said proxy node, and descriptive data for the service provided by the proxy node.

In one or more embodiments, the proposed method further comprises: receiving, originating from the first terminal, a message in said communication, comprising an indication of acceptance by the first terminal of the service provided by the proxy node and a token generated by the first terminal; storing, in a table of active communications for the first terminal, said token associated with said communication.

In one or more embodiments, the proposed method further comprises: after an acceptance by the first terminal of the service provided by the proxy node, modifying a source or destination address and/or a source or destination port number of a message originating from the first terminal or second terminal, intended for the second terminal or intended for the first terminal and passing through the proxy node which is responsible for relaying said message to the second terminal.

This mechanism advantageously makes it possible to respond to the problem of changes to addresses or port numbers as allocated by a proxy node, as these changes can lead to instability of the QUIC communication because with every change of source address the remote terminal must verify that the QUIC terminal originated the change. The requests used for this purpose may be rejected (in the case of a "rate-limit" policy by the source terminal) or fail because the terminal is not aware of the changes made in the network.

According to another aspect, a data communication device is provided, comprising a processor and a memory operatively coupled to the processor, wherein the processor is configured to implement one of the embodiments of the method proposed herein.

Another aspect relates to a computer program, loadable into a memory associated with a processor, and comprising code portions for implementing one of the embodiments of the method proposed herein during the execution of said program by the processor.

Another aspect relates to a set of data representing, for example through compression or encoding, a computer program as proposed herein.

Another aspect relates to a non-transitory storage medium for a computer-executable program, comprising a set of data representing one or more programs, said one or more programs comprising instructions which, during the execution of said one or more programs by a computer comprising a processor operatively coupled to a memory and to an input/output interface for data communication, cause the computer to manage a communication between a first terminal and a second terminal in a communication network according to one of the embodiments of the method proposed herein.

BRIEF DESCRIPTION OF THE DRAWINGS

Other features and advantages of the present disclosure will be apparent in the following description of some non-limiting embodiments, with reference to the accompanying drawings, in which.

DETAILED DESCRIPTION

Figure 1:
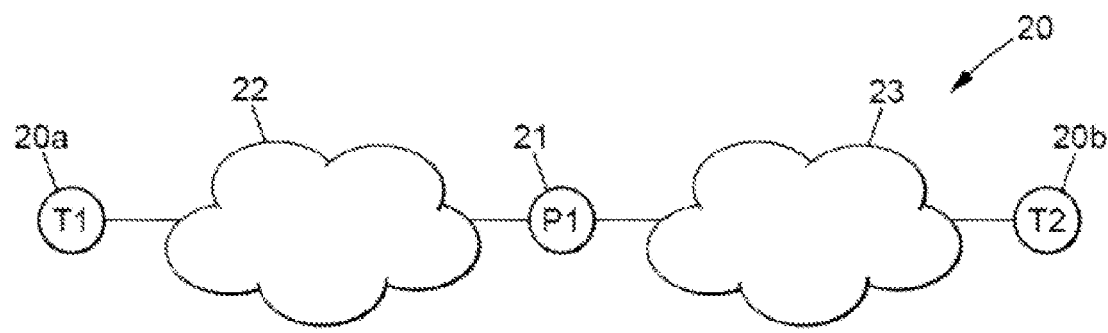
FIG. 1 illustrates an exemplary communication system for implementing one or more embodiments.

In the following detailed description of embodiments of the present disclosure, many specific details are presented to provide a more complete understanding. Nevertheless, a person skilled in the art can appreciate that some embodiments may be implemented without these specific details. In other cases, well-known features are not described in detail in order to avoid unnecessarily complicating the description.

This description refers to functions, units, modules, and diagram illustrations of methods and devices according to one or more embodiments. Each of the functions, modules, units, and diagrams described can be implemented in hardware or software form (including in the form of embedded software ("firmware", or "middleware"), microcode, or any combination of these. In the case of implementation in software form, the functions, units, modules, and/or diagram illustrations can be implemented by computer program instructions or software code, which can be stored or transmitted on a computer-readable medium (for example such as an electronic storage medium (USB keys, CD-ROM, DVD, memory card, etc.) or a communication medium), including a non-transitory medium, or a medium loaded in memory of a generic or specific computer or of any other programmable data processing device or apparatus to produce a machine, such that the computer program instructions or the software code executed on the computer or the programmable data processing device or apparatus constitute means for implementing these functions. The instructions may comprise code of any computer programming language or computer program element.

"Server" is understood herein to mean any point of service (virtualized or not) or device providing data processing, one or more databases, and/or data communication functions. For example, and without limitation, the term "server" can refer to a physical processor operatively coupled with associated communication, database, and data storage functions, or can refer to a network, a group, a set, or a complex of processors and associated data storage and networking devices, as well as an operating system and one or more database system(s) and application software supporting the services and functions provided by the server.

The terms "network" and "communication network" as used herein refer to one or more data links which can couple or connect devices, possibly virtualized, so as to allow the transport of electronic data between computer systems and/or modules and/or other electronic devices or equipment. A network may comprise, in whole or in part, the Internet, one or more local area networks (LAN), one or more wide area networks (WAN), wired type connections, wireless type connections, cellular type connections, or any combination of these various networks.

The terms "operatively coupled", "coupled", "mounted", "connected", refer to couplings, connections, assemblies, which may be direct or indirect, and in particular comprise connections between electronic devices or between portions of such devices which enable the operations and functions as described herein. These may be physical or mechanical connections or couplings, or via one or more wired and/or wireless connection(s).

The term "terminal" is used herein to designate any entity such as a software entity capable of functioning as an end point of a communication established according to the procedures of the QUIC protocol. For a given communication, a terminal which implements the QUIC protocol (also referred to hereinafter as a "QUIC terminal") can act as a QUIC client, QUIC server, or both. Examples of terminals include, without limitation, intelligent terminals ("smart phones"), personal computers ("PC"), tablets, Internet servers, etc.

The term "packet", as used herein, designates without limitation any data unit capable of being transported or transmitted between two network nodes, two stations, two terminals, or across one or more data networks. A "packet" can designate one or more frames, one or more protocol data units ("PDU"), one or more datagrams, or any other data unit. For example, a packet can include a group of bits, which can include one or more address fields, one or more control (or signaling) fields, and/or one or more payload data fields.

"QUIC protocol", or abbreviated as "QUIC", is understood to mean any protocol conforming to a version of the QUIC protocol specification or draft specification, such as the draft specification of the IETF entitled "QUIC: A UDP-Based Multiplexed and Secure Transport", or the "Quick UDP Internet Connections" protocol specification, Google's implementation of this sometimes being referred to as "gQUIC" (Google QUIC), including existing versions of these specifications or draft specifications and their evolutions. More generally, QUIC denotes any transport protocol encapsulated within another transport protocol such as UDP or UDP-lite (Lightweight User Datagram Protocol) but whose primitives and payload are completely encrypted.

FIG. 1 illustrates an example of a communication system (20) in which one or more embodiments of the proposed methods and devices can be implemented.

The system (20) comprises a first terminal T1 (20a) in communication with a second terminal T2 (20b) via: a first network (22) to which the first terminal is connected, a proxy node P1 (21) connected to the first network (22) as well as to a second network (23), and a second network (23) to which the second terminal T2 (20b) is connected. As a non-limiting example, the first network (22) may be a local area network (LAN) in which terminal T1 is present, and the second network may be a wide area network (WAN) (comprising a wireless network WLAN, a cellular network (2G, 3G, 4G and/or 5G), an ADSL network, a fiber access network (FTTH/FTTC), or any combination of these), in which terminal T2 is present. The proxy node may be implemented in an access gateway, for example of the CPE type ("Customer Premises Equipment") when the gateway is residential.

In one or more embodiments, the first terminal T1 and the second terminal T2 can carry out communications according to the QUIC protocol (or "QUIC communications", for simplicity in the remainder of the description), meaning they can establish a connection according to the procedures provided for by the QUIC protocol and exchange data using this connection. A proxy node P1 may be located on the path of the QUIC messages (i.e. messages in compliance with the QUIC protocol) exchanged during the QUIC communication between the first terminal T1 and the second terminal T2.

In one or more embodiments, the proposed method comprises, at a first terminal for which a QUIC communication is established with a second terminal, the discovery of at least one proxy node between the first terminal and the second terminal, the proxy node being capable of providing at least one service for the communication between the first terminal and the second terminal. Proxy nodes can offer various services such as anti-virus services, covert stream detection, packet inspection or DPI, mitigation of a denial of service attack, etc.

In one embodiment, the discovery of a proxy node may comprise the reception of a message originating from the proxy node, or originating from the second terminal and having passed through the proxy node, comprising an indication of the service provided by the proxy and an identifier of the proxy node.

Described below are schemes for the discovery of a proxy node (and the services that it supports) by a terminal according to one or more embodiments, with reference to FIGS. 2a to 2d.

Figure 2A:
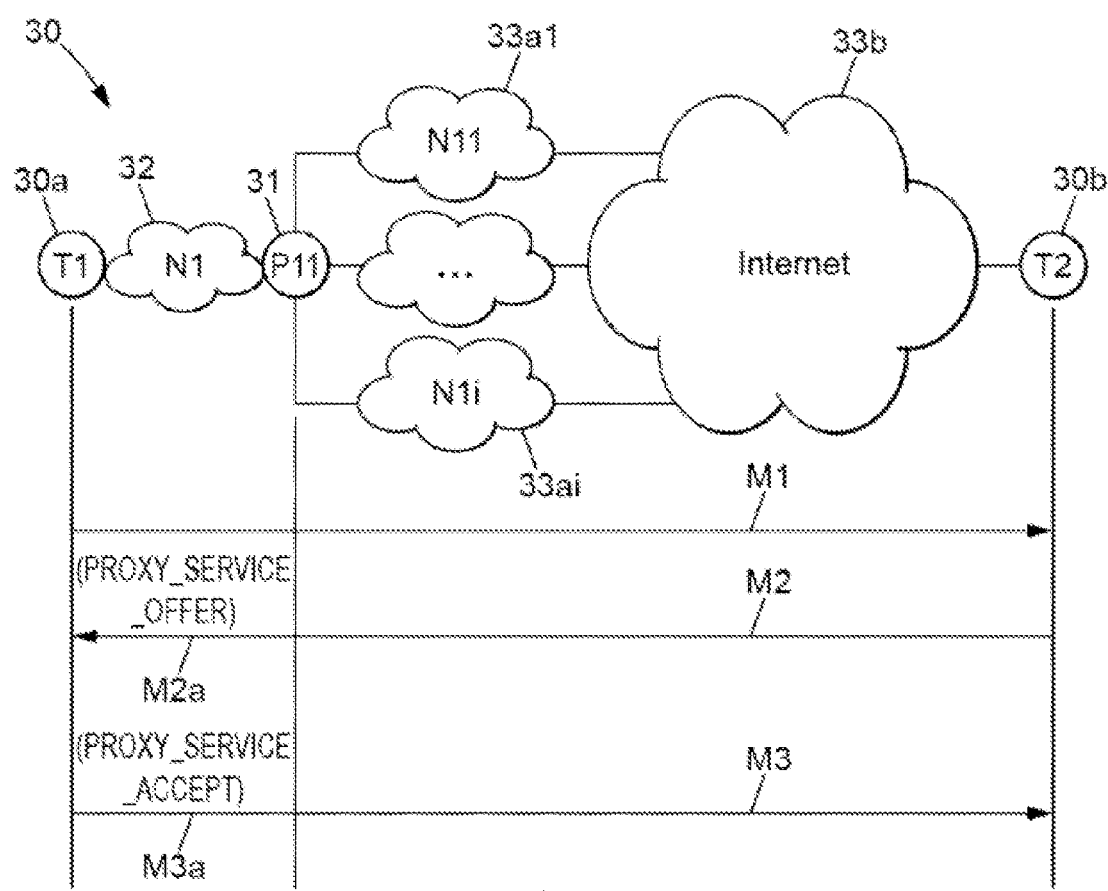
FIG. 2a illustrates an exemplary implementation of the proposed method according to one or more embodiments.

FIG. 2a illustrates an example of a communication system (30) comprising a first terminal T1 (30a) in communication according to the QUIC protocol with a second terminal T2 (30b) via a first network N1 (32) to which the first terminal is connected and via a proxy node P11 (31) connected to the first network (32) as well as to a second network comprising a plurality of subnetworks (33a1-33ai) connected to the Internet (33b), and via the second network to which the second terminal T2 (30b) is connected. As a non-limiting example, the first network (32) may be a local area network (LAN) in which terminal T1 is present. The proxy node (31) may be implemented in an access gateway, for example of the CPE type.

In one or more embodiments, the proxy node (31) may be configured to provide a service comprising an access by the proxy node to multiple paths which allow communication between the first terminal and the second terminal to be supported.

In one or more embodiments, the first terminal T1 (30a) initiates a QUIC communication to the second terminal T2 (30b) while indicating that it supports QUIC extensions via multiple paths. To do this, the first terminal TA (30a) may in particular send a new QUIC frame, here called MP_STATUS(Status=Enabled), in a control message to the second terminal T2 (30b). Preferably, the first terminal T1 sends this frame even if only one path is available locally at the first terminal T1 (for example a single network interface is activated on terminal T1): indeed, multiple paths may be offered by other elements of the network such as by the proxy node (31) for example or may appear as the network evolves. By negotiating beforehand the support for QUIC extensions via multiple paths between terminals T1 and T2, we can thus avoid migration of the connection in the event of a change in the quadruplet (source address, source port number, destination address, destination port number) used for the communication.

The second terminal T2 can then confirm the activation of the QUIC extensions via multiple paths by also responding with a MP_STATUS(Enabled) frame. The messages of the QUIC communication between the first terminal T1 and the second terminal T2 can then be exchanged via multiple paths.

On the other hand, if no MP_STATUS(Enabled) frame is received from terminal T2, terminal T1 deactivates the QUIC extensions via multiple paths. In this case, in the event of a change in the quadruplet (source address, source port number, destination address, destination port number) used for a communication, the terminals migrate the QUIC communication in accordance with the current specification of the QUIC protocol.

Note that the MP_STATUS frame can be used to carry other information regarding the support of multiple paths by the terminals. Other values can thus be provided for the Status field, such as an "Unsupported" value for example, indicating that the QUIC extensions via multiple paths are not supported by the terminal, or a "Disabled" value indicating that the QUIC extensions via multiple paths are disabled by the terminal.

It should also be noted that the MP_STATUS frame can be sent at initialization of the QUIC communication with terminal T2, but also, more generally, at any time in the communication. Terminal T1, as well as terminal T2, can originate the sending of this frame. Similarly, both terminals can disable support for QUIC extensions via multiple paths at any time, using the MP_STATUS(Disabled) frame.

Figure 3A:
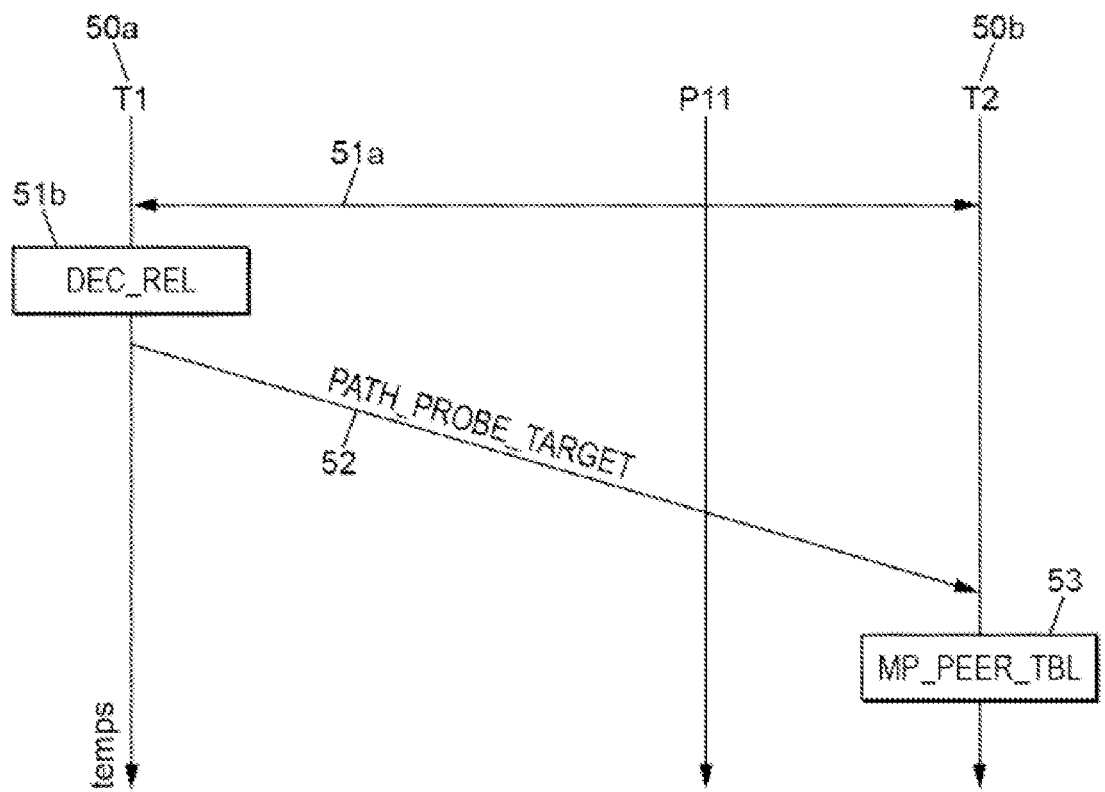
FIG. 3a illustrates an exemplary implementation of the proposed method according to one or more embodiments.

Referring to FIG. 2a, in one or more embodiments, the first terminal T1 (30a) and the second terminal T2 (30b) exchange QUIC messages in a communication according to the QUIC protocol established between these two terminals. FIG. 3a illustrates an example of a sequence of transmissions of QUIC messages, in which the first terminal T1 (30a) sends a first QUIC message M1 to the second terminal T2 (30b), the second terminal T2 (30b) sends a second QUIC message M2 to the first terminal T1 (30a), then the first terminal T1 (30a) sends a third QUIC message M3 to the second terminal T2 (30b).

In one or more embodiments, the proxy node P11 (31) is configured to insert, into a message intended for the first terminal and originating from the second terminal and passing through the proxy node, data indicating support for the service by the proxy node, the data comprising an identifier of the proxy node.

In one or more embodiments, the proxy node P11 (31), placed on the path of the communication according to the QUIC protocol between the first terminal T1 (30a) and the second terminal T2 (30b) (in other words, capable of intercepting messages exchanged between the two terminals), transmits to the first terminal a message (PROXY_SERVICE_OFFER) in the communication according to the QUIC protocol which comprises data indicating support by the proxy node P11 (31) for a QUIC proxy service, for example an indication of the service that the proxy node can provide and an identifier of the proxy node. The PROXY_SERVICE_OFFER message allows the proxy node P11 (31) to indicate to the first terminal T1 (30a) that it can provide one or more proxy services within the QUIC communication between the first terminal and the second terminal.

In one or more embodiments, the data indicating the support by the proxy node P11 (31) for the QUIC proxy service are included in a UDP option.

Figure 2B:
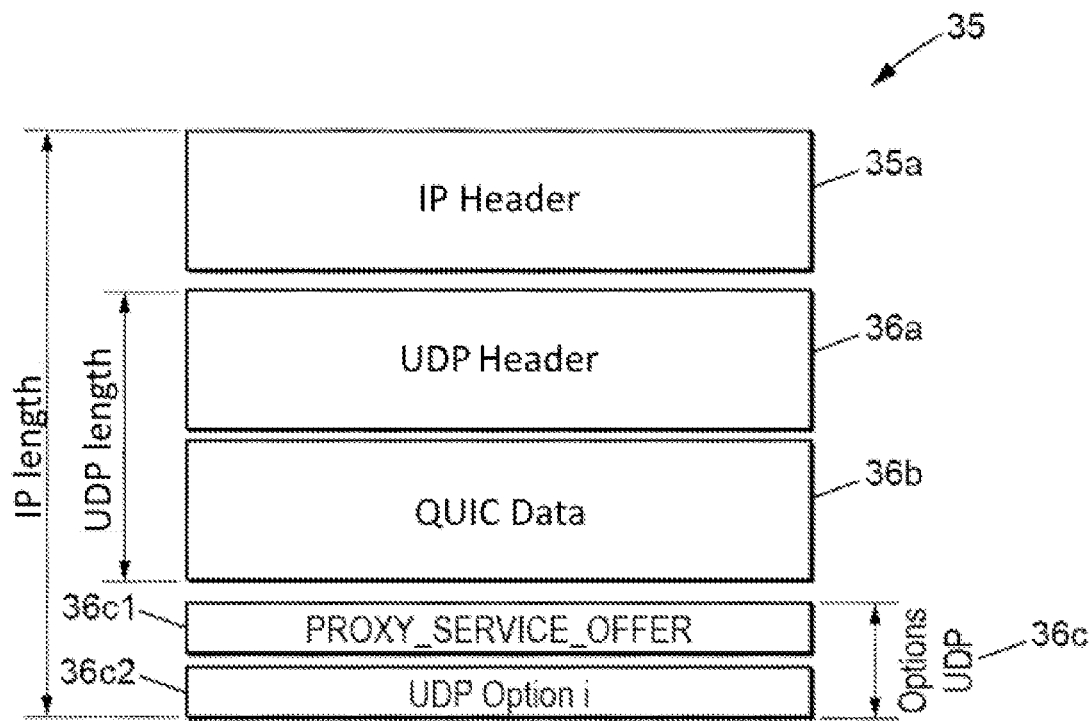
FIG. 2b illustrates an exemplary encapsulation of a proxy service announcement information option in a UDP packet according to one or more embodiments.

For example, proxy service announcement information can be inserted by a proxy in a new UDP option, for example called PROXY_SERVICE_OFFER, as illustrated in FIG. 2b. FIG. 2b shows the encapsulation of a proxy service announcement information option (PROXY_SERVICE_OFFER) in a UDP datagram. The IP packet (35) shown in the figure includes an IP header (35a) and a UDP datagram including a UDP header (36a), QUIC data (36b), and UDP options (36c) including a "PROXY_SERVICE_OFFER" option (36c1) and a second UDP option (36c2). The use of a UDP option advantageously makes it possible to overcome the constraints imposed by encryption of the data exchanged according to the QUIC protocol.

In addition, the PROXY_SERVICE_OFFER option can advantageously be inserted at any time during the duration of the QUIC connection between the first terminal and the second terminal.

In one or more embodiments, one or more PROXY_SERVICE_OFFER options may be present in the same message. These options may be inserted by the same proxy node or by several proxy nodes.

In one or more embodiments, the data indicating support by the proxy node may comprise, in addition to the identifier of the proxy node, at least one among: a service offer identifier, at least one reachability information item of the proxy node (i.e. data enabling access to the proxy node such as an IP address, also referred to as "locators" hereinafter), and descriptive data for the service provided by the proxy node.

Thus, in one or more embodiments, the data indicating support by the proxy node P11 (31) for the QUIC proxy service may comprise one or more first locators of the proxy node (Locator(s)), as well as possibly, depending on the embodiment, a service offer identifier ("Offer_ID"), a proxy node identifier ("Relay_ID"), and/or service description data ("Service Description"). For example, the proxy service announcement information may be inserted into a PROXY_SERVICE_OFFER option comprising a field carrying an identifier of the proxy node ("Relay_ID") and possibly one or more among a field carrying a service offer identifier ("Offer_ID"), a field carrying locators of the proxy node ("Locator(s)"), and a field carrying service description data ("Service Description").

In one or more embodiments, the PROXY_SERVICE_OFFER option may be structured according to a TLV (Type, Length, Value) format. The "Value" field may include at least one IP address, used to reach the proxy node. For example, in one embodiment the "Value" field may comprise the following elements:

A first field ("Relay_ID"), carrying an identifier for the proxy node which inserted the option. This information is useful if there are several proxies present in the same path. This identifier can also be used for identification purposes. In this case, the identifier is generated according to a procedure known to the terminals. The SHA-256 algorithm may be used for example to generate a hash based on the public security keys of a proxy.

A second field ("Offer_ID"), carrying an identifier of a proxy service offer. This identifier can advantageously be used to correlate the messages sent by a proxy node and the responses received from a terminal, as described in more detail below. In doing so, the proxy node controls the terminals to which it can offer its service. This identifier will preferably be randomly generated.

A third field ("Locator(s)"), carrying one or more locators for reaching the proxy node; a locator may be for example, depending on the embodiment, an IPv4 address, an IPv6 address, or an IP address and a port number.

A fourth field ("Service Description") carrying the description of the services offered by the proxy. For example, this field indicates a list comprising one or more traffic load distribution algorithms supported by the proxy node, and/or any information characteristic of the proxy service. This fourth field thus makes it possible to invite the first terminal to choose a service from the list. In one embodiment, the proxy node can be configured to choose a default service if no choice is returned for the QUIC connection by the first terminal.

An integrity check on the content of the PROXY_SERVICE_OFFER option may be performed by the first terminal in accordance with the QUIC protocol used, for example using "UDP checksum" or any other mechanism for checking the integrity of the adapted content, such as the definition of an "HMAC" field which carries the digest of the content of the PROXY_SERVICE_OFFER option (i.e. the application of a "keyed Hashed Message Authentication Code" (HMAC) function). Such an integrity check constitutes a verification of the reliability of the proxy node within the meaning of the present disclosure. Other verifications can alternatively be considered.

In one or more embodiments, the descriptive data of the service(s) provided by the proxy node may be incorporated by the proxy node in a message in the communication established according to the received QUIC protocol, originating from the second terminal, and intended for the first terminal. For example, with reference to FIG. 2a, the proxy node P11 (31) can insert into the message M2 originating from the second terminal (30b) and intended for the first terminal (30a) a proxy support offer (proxy service offer), in the form of a PROXY_SERVICE_OFFER message. Thus, message M2a received by the first terminal T1 (30a) comprises (PROXY_SERVICE_OFFER) data inserted by the proxy node P11 (31) and indicating support by this proxy node for a proxy service.

The use of a message transmitted by a remote terminal (the second terminal T2) to a local terminal (the first terminal T1) at the proxy node P11 in order to insert proxy service offer data therein advantageously makes it possible to reduce the signaling associated with the transmission of proxy service offer data. The proxy node in fact takes advantage of a QUIC message transmitted to terminal T1 to transmit service offer data to it.

In one or more embodiments, the first terminal T1 (30a) may be configured to respond, after receiving data indicating support by the proxy node P11 (31) for a proxy service, to the proxy node P11 (31) by indicating that it accepts or refuses, as the case may be, the use of the proxy service(s) offered by the proxy node P11 (31).

In the event that the first terminal T1 (30a) refuses to use the proxy service offered by the proxy node P11 (31), it can transmit to the proxy node a QUIC message comprising data (for example a "PROXY_SERVICE_DISCARD" message) indicating its refusal to use the proxy service. In this case, the proxy node can receive, originating from the first terminal, a QUIC message comprising data indicating a refusal to use the proxy service. In one or more embodiments, the data indicating its refusal to use the proxy service may comprise the identifier of the proxy node and/or the service offer identifier that the first terminal T1 (30a) received in the data indicating support for a proxy service.

In the case where the first terminal T1 (30a) accepts the use of the proxy service offered by the proxy node P11 (31), it may send a message intended for the proxy node P11 (31), or intended for the second terminal and passing through the proxy node P11 (31), comprising an indication intended for the proxy node P11 (31) of the acceptance of the service by the first terminal T1 (30a), and a token generated by the first terminal T1 (30a).

For example, in one or more embodiments, in the case where the first terminal T1 (30a) accepts the use of the proxy service offered by the proxy node P11 (31), it may transmit to the proxy node a QUIC message comprising data indicating its acceptance of the use of the proxy service.

In this case, the proxy node may receive, originating from the first terminal, a QUIC message comprising data indicating an acceptance of the use of the proxy service.

In one or more embodiments, the proxy information message may comprise at least one element among: reachability information of the proxy node enabling access to the proxy node, an identifier of a communication between the first and second terminal along a path involving the proxy node, and a challenge generated by the first terminal.

In one or more embodiments, the data indicating its acceptance of the use of the proxy service may comprise the identifier of the proxy node and a token generated for example randomly by the first terminal. In one or more embodiments, the data indicating its acceptance of the use of the proxy service may further comprise the service offer identifier and/or all or part of the service description data that the first terminal T1 (30a) received in the data indicating support for a proxy service, as well as a challenge generated by the first terminal, for example randomly.

Thus, in one or more embodiments, the proxy node may be configured to receive, originating from the first terminal, a message in the communication between the first terminal and second terminal comprising an indication of an acceptance by the first terminal of the service provided by the proxy node and a token generated by the first terminal, then to store the received token in a table of active communications for the first terminal, in association with the communication.

In one or more embodiments, the proxy node may also, following an acceptance by the first terminal of the service provided by the proxy node, be configured to modify a source or destination address and/or a source or destination port number of a message originating from the first terminal or from the second terminal, intended for the second terminal or for the first terminal, respectively, and passing through the proxy node which is responsible for relaying said message to the second terminal.

In one or more embodiments, in the case where the first terminal refuses to use the proxy service offered by the proxy node, it may insert data into a QUIC message sent to the second terminal, indicating a refusal to use the proxy service. In this case, the proxy node will receive a QUIC message originating from the first terminal and intended for the second terminal which comprises data (for example "PROXY_SERVICE_DISCARD") indicating a refusal by the first terminal to use the proxy service.

For example, in one or more embodiments, in the case where the first terminal T1 (30a) accepts the use of the proxy service offered by the proxy node P11 (31), it may insert, in a QUIC message (M3) sent to the second terminal T2 (30b), data (for example "PROXY_SERVICE_ACCEPT") indicating an acceptance of the use of the proxy service. In this case, the proxy node will receive a QUIC message originating from the first terminal and intended for the second terminal comprising data (for example "PROXY_SERVICE_ACCEPT") indicating an acceptance by the first terminal of the use of the proxy service.

The use of a message transmitted by the local terminal (the first terminal T1) to the remote terminal (the second terminal T2) to insert data therein indicating acceptance or refusal of the proxy service, as the case may be, advantageously makes it possible to reduce the signaling associated with the transmission of an explicit response to the proxy service offer. The local terminal T1 in fact takes advantage of a QUIC message transmitted to the remote terminal T2 to transmit proxy service acceptance or refusal data to the proxy node P11.

As mentioned above, in one or more embodiments, the first terminal may be configured to indicate, during establishment of the communication between the first and second terminal or at any other time during the communication, to the second terminal that the first terminal supports an extension of the QUIC protocol which allows establishing the communication according to the QUIC protocol on multiple paths, even if only one path is locally available at the first terminal.

In one or more embodiments, the proxy node may receive, originating from the first terminal and intended for the second terminal, a message (M3a) in the communication established according to the QUIC protocol, comprising data (for example "PROXY_SERVICE_ACCEPT") indicating that the first terminal accepts the proxy service. Following the reception of this message, the proxy node may modify (M3a→M3) the message in the communication established according to the QUIC protocol in order to remove the data indicating that the first terminal accepts the proxy service, then transmit the modified message (M3) to the second terminal.

In one or more embodiments, the proxy node may further be configured to transmit data to the second terminal indicating support by the proxy node for a proxy service.

In one or more embodiments, the proxy node may be configured to determine that the first terminal is not interested in the proxy service, in the event that no response to the message announcing support by the proxy node for a proxy service is received from the first terminal (implicit refusal), or if a message refusing the use of the proxy service has been received from the first terminal (explicit refusal).

In one or more embodiments in which a plurality of paths are accessible to the proxy node for routing packets between the first terminal T1 and the second terminal T2, the proxy service offer message (for example, "PROXY_SERVICE_OFFER") may comprise data indicating support by the proxy node for a QUIC proxy service via multiple paths.

Thus, the service offered by the proxy node may include access by the proxy node to multiple paths for supporting the communication between the first terminal and the second terminal.

For example, the proxy node may receive, originating from the first terminal and intended for the second terminal, a message from the communication established according to the QUIC protocol, comprising data indicating that the first terminal accepts the use by the proxy node of multiple paths that can be taken by the data exchanged within the communication established according to the QUIC protocol with the second terminal. In one embodiment, the proxy node may further modify the QUIC message to delete therein the data indicating that the first terminal accepts the use by the proxy node of multiple paths for the communication established according to the QUIC protocol with the second terminal, then to transmit the modified message to the second terminal.

In one or more embodiments, the proxy node may be configured to include data indicating support for a proxy service (for example the "PROXY_SERVICE_OFFER" information) in a plurality of messages, or even in all messages of a QUIC communication intended for a terminal (T1).

In one or more embodiments, a same proxy may be configured to include data indicating support for a proxy service (for example the PROXY_SERVICE_OFFER information) in messages intended for T1 and T2.

In one or more embodiments, the proxy node may be configured to verify, upon receiving data indicating an acceptance by the first terminal of the use of the proxy service (for example upon receiving a "PROXY_SERVICE_ACCEPT" option), that this response from the first terminal corresponds to an offer sent by the proxy node to this terminal. To do so, in one embodiment, the proxy node may further be configured to determine whether the value of the field carrying a proxy service offer identifier ("Offer_ID"), received among the data indicating an acceptance by the first terminal of the use of the proxy service, corresponds to an offer identifier stored in memory, for example in a table for saving the identifiers of offers previously sent to terminals.

In one or more embodiments, the proxy node may further be configured to reject (for example by ignoring it) the acceptance by the first terminal of the use of the proxy service if no offer is found among those previously sent to terminals which correspond to the identifier received from the first terminal. For example, in the specific and non-limiting context of using the proxy to manage multiple paths for the QUIC communication between the two terminals, if no offer is found, then the proxy node rejects this message and as a result does not modify its policy or policies for managing multiple paths.

In one or more embodiments, the proxy node may further be configured to extract, when an offer is found among those previously sent to terminals which correspond to the identifier received from the first terminal, data indicating an acceptance by the first terminal of the use of the proxy service the token ("Token") or the "Challenge" as well as, where appropriate, other information characteristic of a proxy service offer, and to save them in memory, for example in a table of active QUIC connections for the first terminal (for example called "PROXY_SERVICE_PEERS"). In one or more embodiments, the proxy node may further be configured to restrict the use of the received key or token to a single IP address, a single prefix, or to a single pair consisting of an IP address and a port number. In this case, only the requests sent to a particular address of the proxy will be associated with a given token.

Thus, in one or more embodiments, the message sent by the first terminal to indicate to the proxy node an acceptance of the use of the services of the proxy node may comprise an algorithm for distributing the traffic load between multiple paths, intended to be applied by the proxy node. The algorithm possibly selected may thus be used by the proxy node for the management of the QUIC communication between the first terminal and the second terminal, for example for the management of this communication via multiple available paths. By means of this method, a terminal can negotiate the distribution algorithm by QUIC connection. Certain connections associated with the same terminal can benefit from a resilience service in the event of a primary path being unavailable, while other connections of the same terminal can benefit from a "bonding" service.

In one or more embodiments, the proposed method may comprise a reliability check of the proxy node by the first terminal, performed before accepting the use of the proxy node's service.

It should be noted that the method according to the present disclosure is described here with reference to a proxy node located more towards the first terminal T1. This assumption is not limiting, however. The present disclosure also applies to a proxy node located more toward the second terminal T2: the proxy node then acts in the same manner concerning terminal T2 as what has just been described concerning terminal T1; the roles of terminals T1 and T2 are interchanged. The present disclosure can also be applied when one proxy node is located more towards terminal T1 and another proxy node is located more towards terminal T2: in this case, a PROXY_SERVICE_OFFER offer is inserted by the proxy node located more towards terminal T1 in a message sent by terminal T2 to terminal T1 and passing through this proxy node located more towards terminal T1, while a PROXY_SERVICE_OFFER offer is inserted by the proxy node located more towards terminal T2 into a message sent by terminal T1 to terminal T2 and passing through this proxy node located more towards terminal T2.

In addition, the present disclosure also applies to several proxy nodes deployed serially.

Terminals, such as smart phones and personal computers, are now capable of activating and operating several logical interfaces linked to one or more physical interfaces. Such terminals are said to be "multi-interface" (or MIF).

Several IP addresses can then be assigned to these MIF terminals so that they can connect to different types of networks such as a fixed network, a mobile network, or a WLAN network (Wireless LAN), simultaneously or deferred. These IP addresses can belong to the same address family or to different address families (IPv4, IPv6, or both), have different lifespans, have different scopes (e.g. private IPv4 address, unique IPv6 address of local scope ("Unique Local Address", or ULA), or IPv6 address of global scope ("Global Unicast Address", or GUA), and be assigned to the same logical network interface or to different logical network interfaces of the same terminal.

The "MIF" characteristic is volatile, because the ability to use several interfaces depends on the connection conditions to the network(s), the location of the device, or other factors. An MIF terminal may in particular manage the plurality of interfaces available to it during the establishment of a simple connection (meaning a connection established along a single path with a given party), or even after the establishment of a simple connection.

In addition, a terminal does not initially know whether it is possible for it to use several distinct paths to establish a communication with a given party; more precisely, the terminal only acquires this information (if applicable) at the end of a phase during which it attempts to establish a communication with the party by using multiple paths.

In cases where a terminal has several interfaces capable of connecting it to different access networks (for example fixed, mobile, or WLAN), it then benefits from a "hybrid" access, because it combines different technologies for network access. The service offers concerning a terminal with hybrid access are based on the introduction of functions into the network allowing the aggregation of all network connections of a terminal (for example: WLAN and 3G, ADSL, WLAN, and 4G, or 4G and 5G).

In the field of networks, the term "link aggregation" generally designates a grouping of several links associated with as many (logical) interfaces as if it were a single link associated with a single interface, in particular with the aim of increasing throughput beyond the limits of a single link, but also of applying the same operating procedures to all links aggregated in this manner (concept of "fate sharing"). Optionally, link aggregation also makes it possible to have other interfaces take over if a network link fails (principle of redundancy). Link aggregation applies to any type of traffic carried along these links, including IP traffic.

Link aggregation can also be used to distribute traffic over multiple links. In this case, the distribution of traffic between links in an aggregation depends on various parameters. The distribution of traffic depends, for example, on the type of traffic (for example TCP traffic or UDP traffic), or on the traffic engineering policy (specifying for example a required quality of service level (or "QoS").

It should be noted that various aggregation modes can be envisaged, including a "fallback" mode (consisting of using secondary paths if the primary paths are unavailable), an "associative" mode (consisting of using the resources associated with all or part of the available paths, the IP channels associated with a same application able to be distributed across several paths) and a "comfort" mode (similar to the associative mode, except that the channels of a given application are not distributed among multiple paths, but are sent over a single path).

These various modes are not mutually exclusive, and are not specific to a particular type of traffic. Thus, they can be set up independently of the type of traffic that will be routed along the aggregated paths according to one or another of the various modes.

A terminal, having several network attachments, may have one or more IP addresses assigned to each of its physical or logical interfaces. It may also have only one interface, in which case it can be assumed to be located behind a residential gateway connected to one or more networks and compatible with a link aggregation mechanism. In addition, a gateway can be configured to refrain from using a network link aggregation mechanism for certain networks or under certain operating conditions (for example, in the event of an overload of network connection concentrators).

Examples of embodiments in the non-limiting context of a proxy service for using multiple paths for a communication established according to the QUIC protocol between two terminals are detailed below.

In one or more embodiments, in the case where a device (called a "proxy"), located on the path of the QUIC packets exchanged by two terminals T1 and T2, has access to several paths for routing packets between the two terminals T1 and T2, this proxy inserts information in a QUIC message intended for terminal T1, for example called "PROXY_SERVICE_OFFER", indicating support for the QUIC proxy service via multiple paths.

Figure 2C:
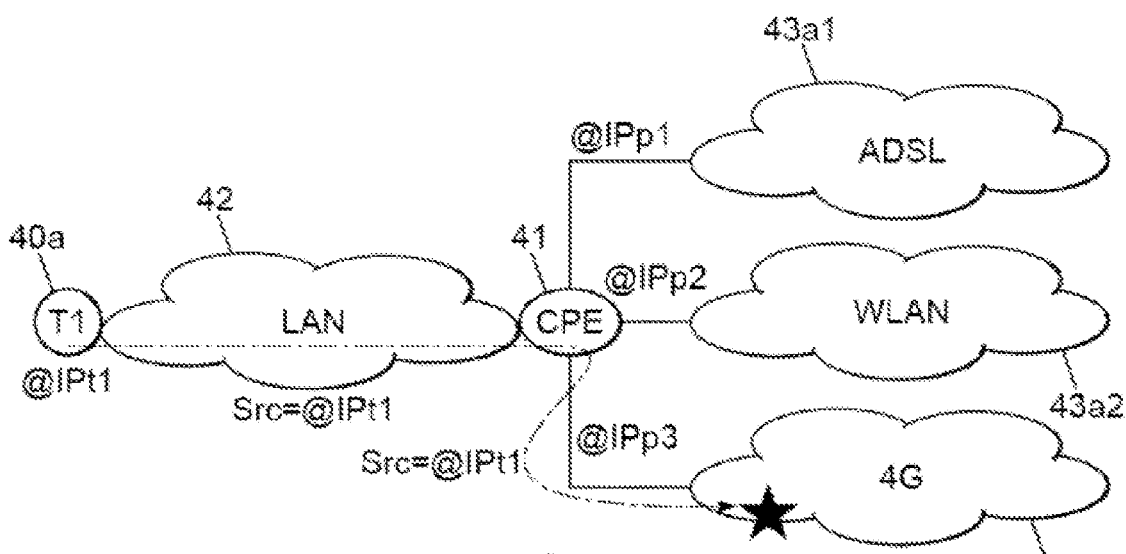
FIG. 2c illustrates an exemplary implementation of the proposed method according to one or more embodiments.

The proxy service can make it possible to use the resources of the multiple available paths to improve the performance or resilience of a QUIC connection. In one or more embodiments, this use of resources may include rewriting the source address of the packets received from terminal T1 (respectively, the destination address of the packets intended for T1) in order to be able to route the packets via certain paths. FIG. 2c illustrates an example of a problem encountered in routing packets over multiple paths if the source address is not rewritten by a proxy.

With reference to FIG. 2c, it is assumed that terminal T1 (40a) is present in a LAN (42) connected via a CPE (41) to three networks (ADSL (43a1), WLAN (43a2), and 4G (43a3)). Distinct addresses (or prefixes) (@IPp1, @ IPp2, @ IPp3) are allocated by each of these networks (43a1, 43a2, 43a3) to the CPE (41). An address or prefix (@IPt1) can be delegated to terminal T1 (40a), from one of the prefixes allocated by the networks (ADSL (43a1), WLAN (43a2), and 4G (43a3)). For example, the @IPt1 address could be an address extracted from an IPv6 prefix of @IPp1. In this case, the source address of a packet sent by terminal T1 to terminal T2 is @IPt1. If the proxy node (41), embedded in the CPE, decides to route this packet as is via the 4G network, then this packet will be blocked by the network due to IP address anti-spoofing measures. These measures consist of verifying that the machines connected to a network can only send IP data with a source address allocated by this network. In this case, the proxy node (41) will not be able to use multiple paths, including a path traveling through the 4G network, for the QUIC communication between terminals T1 and T2.

Figure 2D:
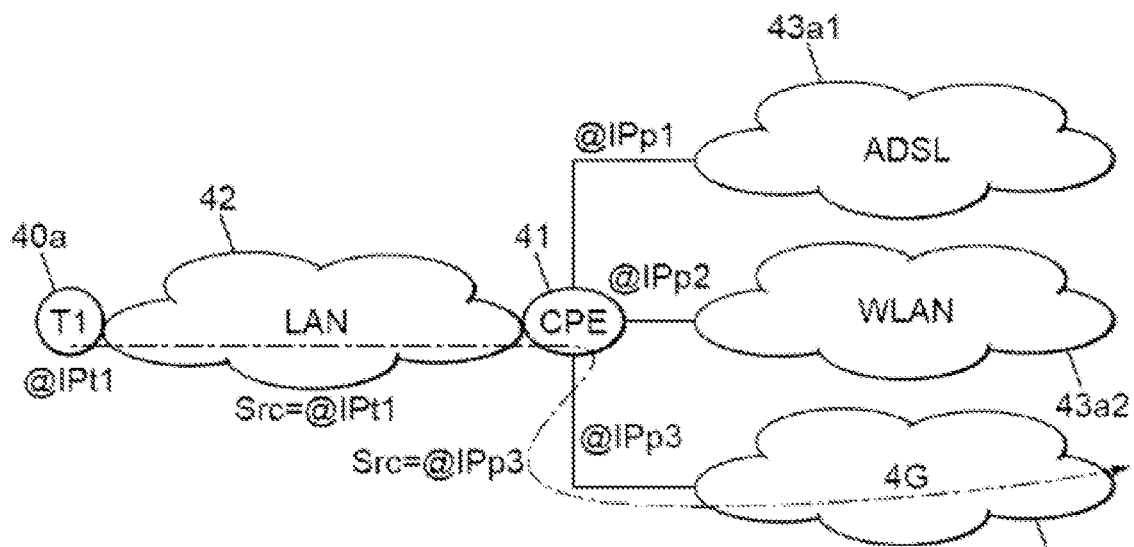
FIG. 2d illustrates an exemplary implementation of the proposed method according to one or more embodiments.

In order to solve this problem, the proxy node (41) may rewrite the source address of the packet with the @IPp3 address, as illustrated in FIG. 2d. In fact, the proxy node (41) may decide to add a path to a connection, remove a path, change an address, change a port number, etc. These decisions are normally local to the proxy and are not necessarily made in concert with terminals T1 and T2.

Consequently, in one or more embodiments, traffic distribution policies may be configured on the proxy node in order to enable it to distribute traffic between the various available networks. Depending on the embodiment, these policies may be configured by a service provider and/or by a user. One example of a policy would be to use radio resources only in the event that a fixed access network is unavailable or the available resources of the primary access network (typically the wired network) no longer allow the characteristic traffic flow of a given application, etc.

Traffic distribution policies can prove to be critical, because an inappropriate use of available resources can lead to rapid consumption of the available quota on a given access link or can even cause a significant increase in the invoice amount to be paid by the user (in the case where the proxy node is embedded in a CPE, for example).

Control of a traffic distribution policy is also important for an operator, in particular because this allows minimizing the risk of congestion in certain links (for example, abusive use of a cellular connection by a proxy can congest a cell to the detriment of single-interface mobile terminals).

Returning to FIG. 2a, in one or more embodiments, the proxy node P11 may be responsible for inserting the "PROXY_SERVICE_OFFER" information. For example, the proxy node may select the QUIC message(s) received from T2 and intended for T1, associated with the same QUIC connection which is to be used to convey the "PROXY_SERVICE_OFFER" information. To do this, in one embodiment the proxy node maintains a table of active QUIC connections with management of the status of each of these connections in order to determine the maximum number of information insertions by QUIC connection, by connection identifier, etc. For example, a proxy may send a "PROXY_SERVICE_OFFER" offer in three different messages of a QUIC connection.

In one or more embodiments, the proxy node may be configured, in the event of a refusal (explicit or implicit) by the (first) terminal to which it has sent a service offer for the use of multiple paths for the QUIC communication of this terminal, to decide unilaterally on a traffic routing policy to be applied for the QUIC communication between the first terminal and the second terminal. In one embodiment, in this situation the proxy node may be configured to disable the mechanisms for exploiting multiple paths for that connection. Thus, if the initial path used for establishing the QUIC connection is no longer available, the proxy node does not switch the traffic to another path, as illustrated in FIGS. 2e and 2f.

Figure 2E:
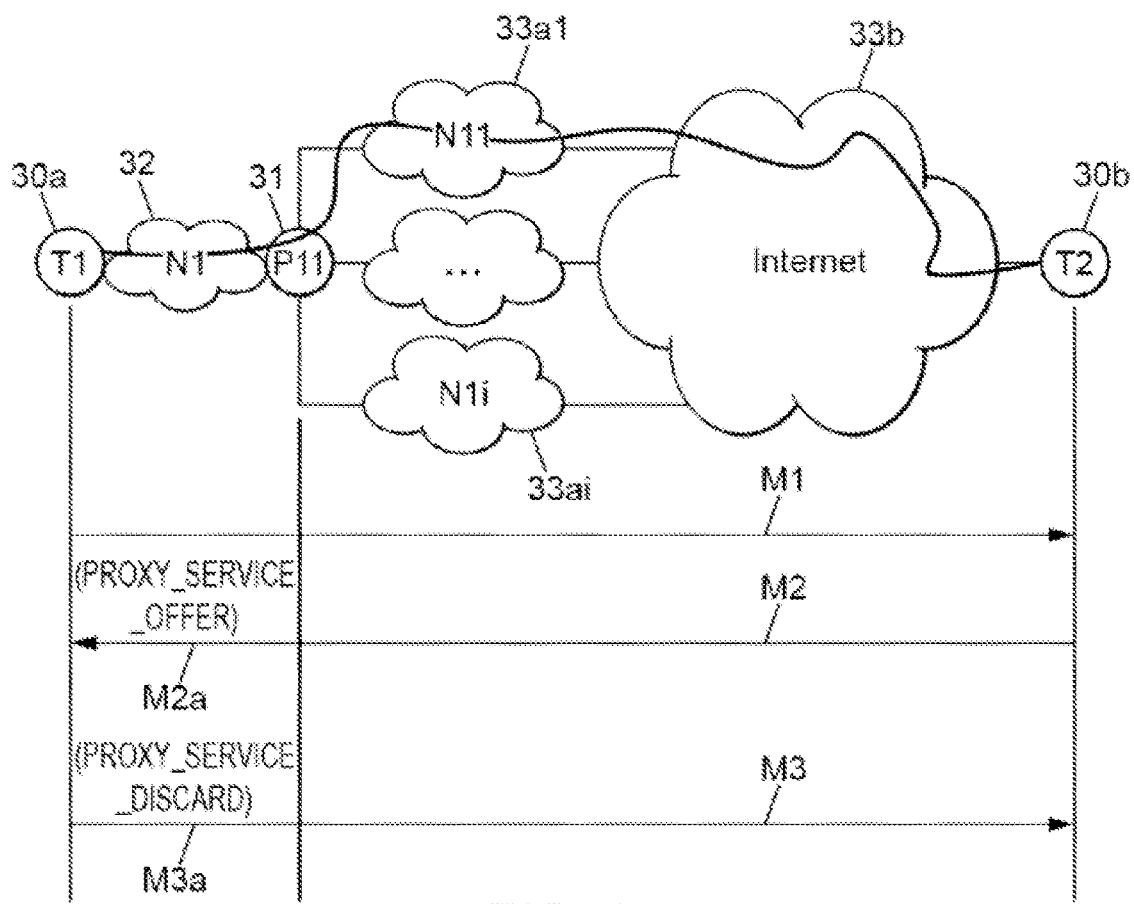
FIG. 2e illustrates an exemplary implementation of the proposed method according to one or more embodiments.
Figures 2F, 2G:
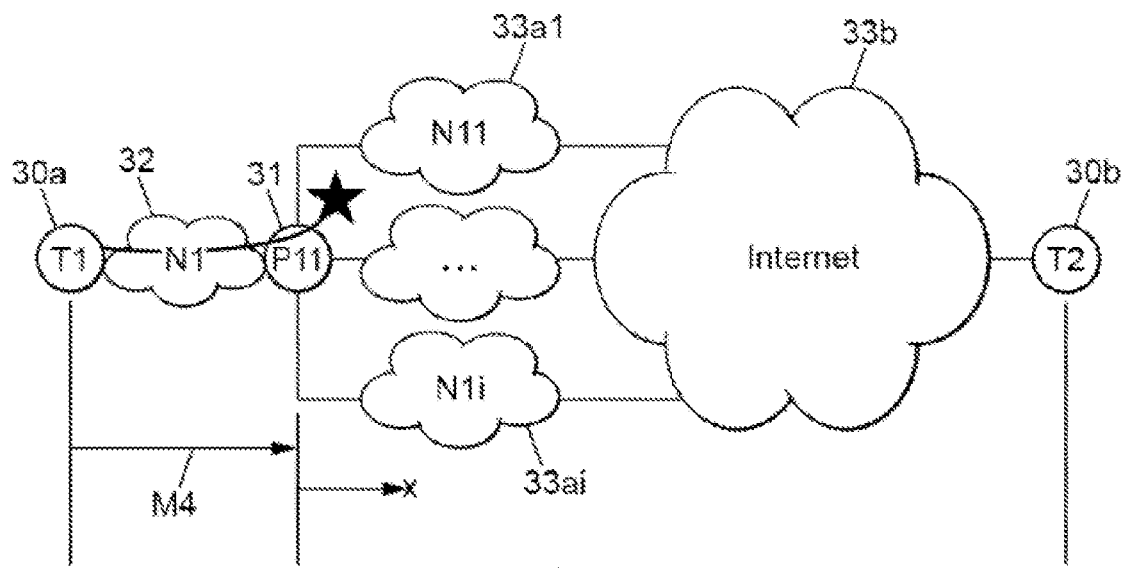
FIG. 2f illustrates an exemplary implementation of the proposed method according to one or more embodiments.
FIG. 2g illustrates an exemplary NEW_CONNECTION_ID frame modified to associate a proxy with a connection identifier according to one or more embodiments.

Similarly to FIG. 2a, FIG. 2e shows a first terminal T1 (30a) which has established a QUIC communication with a second terminal T2 (30b), as well as a proxy node P11 (31) located on the path of the QUIC communication, behind a network N1 (32) relative to the first terminal T1 (30a), and behind a subnetwork N11 (33a1) connected to the Internet (33b) relative to the second terminal T2 (30b).

As illustrated in FIG. 2e, in one or more embodiments, the first terminal T1 (30a), in the context of an exchange of QUIC messages with the second terminal T2 (30b), may transmit to the second terminal T2 (30b) a QUIC message (M1), then receive a QUIC message (M2a) coming from a QUIC message sent by the second terminal and into which the proxy node P11 (31) will have inserted proxy service offer data (PROXY_SERVICE_OFFER) for the use of multiple paths managed by the proxy node for the QUIC communication between the first (T1) and second (T2) terminal.

The first terminal T1 (30a) can refuse the proxy service offer to use multiple paths by inserting, in a QUIC message (M3a) intended for the second terminal T2 (30b), proxy service offer refusal data (PROXY_SERVICE_DISCARD), which will be extracted from the message (M3a) by the proxy node P11 (31) upon receiving the message. The proxy node P11 (M3a) will then transmit a QUIC message (M3), originating from the first terminal T1 (30a), to the second terminal T2 (30b), after having extracted (and removed) from the received message (M3a) the response of the first terminal T1 (30a) to its proxy service offer to use multiple paths.

Upon receiving a refusal to use a proxy service for the use of multiple paths managed by the proxy node for the QUIC communication between the first (T1) and the second (T2)

terminal, the proxy node can deactivate an option to use multiple paths for the QUIC communication between the first (T1) and second (T2) terminal, so that in the event of failure to transmit QUIC packets on the single path used by the first (T1) and second (T2) terminals, a new QUIC message (M4) sent by the first terminal T1 (30a) to the second terminal T2 (30b), reaching the proxy node P11 (31), cannot be successfully transmitted between the proxy node P11 (31) and the second terminal T2 (30b), as illustrated in FIG. 2f.

The embodiments of the proposed method described below concern the point of view of the first terminal (local terminal to the proxy node).

Again with reference to FIG. 2a, in one or more embodiments, the first terminal (local terminal) (30a) may be configured to receive a message (M2a) in the communication established according to the QUIC protocol, and to detect in the received message the presence of data indicating support by the proxy node (31) for a QUIC proxy service.

As described above, the data indicating support by the proxy node P11 (31) for a QUIC proxy service received by the first terminal (30a) may be, in one or more embodiments, comprised in a UDP option. Similarly, in one or more embodiments, these data may comprise first identification data of the proxy node ("Relay_ID"), as well as possibly, depending on the embodiment, first identification data of the service offer ("Offer_ID"), first access data for the proxy node ("Locator(s)"), and/or service description data ("Service Description"). For example, the PROXY_SERVICE_OFFER message may comprise a UDP option comprising an identifier field of the proxy node ("Relay_ID"), and an identifier field of the service offer ("Offer_ID"), a first locator field of the proxy node ("Locator(s)"), and/or a service description data field ("Service Description").

In one or more embodiments, the first terminal (30a) (local terminal) may be further configured to determine, upon receiving data indicating support by the proxy node P11 (31) for a QUIC proxy service, whether the use of the proxy service offered by the proxy node P11 (31) is accepted or not (or, alternatively, whether the use is refused or not), and if the use is accepted (or, alternatively, is not refused), to send a message, intended for the second terminal (remote terminal), in the communication established according to the QUIC protocol, comprising data indicating acceptance by the first terminal of the use of the QUIC proxy service, and in the case where the use is accepted (or, alternatively, is refused), to send a message, intended for the second terminal (remote terminal), in the communication established according to the QUIC protocol, comprising data indicating refusal by the first terminal of the use of the QUIC proxy service.

In one or more embodiments, the data indicating acceptance by the first terminal of the use of the QUIC proxy service may comprise second identification data of the proxy node which correspond to the first identification data of the proxy node that are received with the data indicating support by the proxy node for a proxy service.

In one or more embodiments, the first terminal (30a) may further be configured, in the event that the use of the proxy P11 (31) is accepted (or, alternatively, is not refused), to generate (for example randomly) a token and possibly a "Challenge", and to include this token and where applicable this "Challenge" in the data sent to the second terminal indicating acceptance by the first terminal of the use of the QUIC proxy service.

In one or more embodiments, the first terminal (30a) may further be configured, in the event that the use of the proxy P11 (31) is accepted (or, alternatively, is not refused), to include in the data sent to the second terminal indicating acceptance by the first terminal of the use of the QUIC proxy service, second service offer identification data corresponding to the first service offer identification data received with the data indicating support by the proxy node for a proxy service.

In one or more embodiments, the data indicating acceptance by the first terminal of the use of the QUIC proxy service and the data identifying a proxy node usable for communication with the first terminal may be included in the same message sent over the connection established according to the QUIC protocol and issued by the first terminal intended for the second terminal.

In one or more embodiments in which the proxy service offer message (for example the "PROXY_SERVICE_OFFER" UDP option as described above) comprises data indicating support by the proxy node for a QUIC proxy service via multiple paths, the data indicating acceptance by the first terminal of the use of the QUIC proxy service may further comprise service description data indicating a traffic load balancing algorithm selected by the first terminal for the communication established according to the QUIC protocol on multiple paths with the second terminal.

Thus, in one or more embodiments, upon the reception of a QUIC message by a terminal (or by a proxy node of the path), the latter checks whether one or more PROXY_SERVICE_OFFER options (or PROXY_SERVICE_ACCEPT/PROXY_SERVICE_DISCARD for a proxy node) are present in the received message.

In one embodiment, this verification may comprise a detection of the presence of additional information, for example by comparing the "IP Length" field of the IP header and the "UDP Length" field of the UDP header. The PROXY_SERVICE_OFFER option(s) can thus be extracted from the message, and the terminal can then perform integrity checks on this (these) option(s). In one embodiment, the terminal ignores the PROXY_SERVICE_OFFER option if an anomaly is then detected.

In one or more embodiments, the terminal may be configured to determine whether it can trust the proxy node identified in the received data indicating support for a proxy service. For example, in the case where the proxy node offering proxy service support is implemented within a CPE device to which the terminal is connected (for example by means of a LAN network or a WLAN network) as shown in FIGS. 2c and 2d, the terminal can determine that it can trust the CPE to which it is connected based on the IP address of the CPE. In one embodiment, the terminal may be configured with a list of trusted proxies deployed by the IP connectivity provider, in which case the trust verification can be done on the basis of proxy identification data received with the data indicating support for a proxy service (for example, a proxy identifier ("Relay_ID")). Other trust verification mechanisms, in addition to or as an alternative to those described above, may be implemented by the terminal within the framework of the embodiments of the proposed method. In one embodiment, the PROXY_SERVICE_OFFER option is ignored if the verification concludes that the proxy node is not a trusted element.

In one or more embodiments, if the terminal does not wish to use the resources of the proxy for the current QUIC communication, the terminal includes a PROXY_SERVICE_DISCARD UDP option in a message sent to the remote terminal.

Depending on the embodiment, this option may include one or more of the following elements:

"Relay_ID": proxy node identification data, corresponding to data possibly received in the data indicating support by the proxy node for a proxy service. These proxy node identification data may for example correspond to a copy of the corresponding field included in the data indicating support by the proxy node for a proxy service (for example in the PROXY_SERVICE_OFFER UDP option).

"Offer_ID": service offer identification data corresponding to those possibly received in the data indicating support by the proxy node for a proxy service. These service offer identification data may for example correspond to a copy of the corresponding field and may be included in the data indicating support by the proxy node for a proxy service (for example in the PROXY_SERVICE_OFFER UDP option).

In one or more embodiments, if the terminal accepts the use of the proxy's resources for the current QUIC communication, the terminal includes a PROXY_SERVICE_ACCEPT UDP option in a message intended for the remote terminal.

Depending on the embodiment, this option may include a token ("Token"), meaning a key generated by the terminal, for example randomly, as well as one or more of the following elements:

"Relay_ID": proxy node identification data corresponding to the data possibly received in the data indicating support by the proxy node for a proxy service. These proxy node identification data may for example correspond to a copy of the corresponding field which are included in the data indicating support by the proxy node for a proxy service (for example in the PROXY_SERVICE_OFFER UDP option).

"Offer_ID": service offer identification data corresponding to those possibly received in the data indicating support by the proxy node for a proxy service. These service offer identification data may for example correspond to a copy of the corresponding field that are included in the data indicating support by the proxy node for a proxy service (for example in the PROXY_SERVICE_OFFER UDP option).

"Service Description": data indicating a traffic load distribution algorithm chosen by the terminal for this QUIC communication. In one embodiment, if no choice is returned in the terminal's response to the proxy service offer, the proxy node may be configured to determine to use a default configuration for that QUIC connection.

"Challenge": A key generated randomly by the terminal.

FIG. 3a illustrates an exemplary implementation of the proposed method according to one or more embodiments.

A first terminal T1 (50a) and a second terminal T2 (50b) can be configured to establish a QUIC communication (by establishing a communication according to the procedures of the QUIC protocol) and to exchange (51a) messages in this QUIC communication.

As described above, the first terminal T1 (50a) may further be configured to discover (51b) a proxy node (P11) located on the path of the communication, which is capable of providing a service for the communication. For example, the first terminal T1 (50a) may be configured to determine, upon receiving a proxy service offer for the QUIC communication between the first terminal T1 (50a) and the second terminal T2 (50b) originating from a proxy node (P11) located on the QUIC communication path between the first terminal T1 (50a) and the second terminal T2 (50b), whether or not this offer is accepted.

In one or more embodiments, in the event that the first terminal T1 (50a) accepts the use of the proxy node's service, the first terminal T1 (50a) may send to the second terminal T2 (50b), in an establishment phase or during the communication (51a) between the first terminal (50a) and the second terminal (50b), an encrypted proxy information message comprising data identifying the proxy node (P11) and a token intended to be provided by the proxy node (P11) to the second terminal (50b).

If this offer is accepted, the first terminal T1 (50a) may be configured to offer to the second terminal T2 (50b) the use of the proxy node in support of the QUIC communication between the two terminals (50a, 50b).

In one or more embodiments, the first terminal may send (52), to the second terminal, a proxy information message ("PATH_PROBE_TARGET" message in FIG. 4a) in the QUIC communication established between the first terminal and the second terminal. The proxy information message may comprise data identifying a proxy node that is usable for communication with the first terminal.

Thus, the second terminal may receive, originating from the first terminal, an encrypted proxy information message comprising a token and data identifying a proxy node between the first terminal and second terminal that is capable of providing a service for the communication between the first terminal and second terminal.

For example, with reference to FIG. 3a, the second terminal T2 (50b) may receive, originating from the first terminal, a proxy information message ("PATH_PROBE_TARGET" message in FIG. 3a) in the QUIC communication established between the first terminal and second terminal, the proxy information message comprising data identifying a proxy node that is usable for communication with the first terminal.

The proxy information message advantageously makes it possible to provide the remote terminal, in the context of a QUIC communication with this remote terminal, with data concerning the use of a proxy node for the QUIC communication.

For example, the first terminal may send to the second terminal a message specific to the QUIC communication; this message will be interpreted by the second terminal as indicating that the first terminal is offering to use one or more proxy services for the QUIC communication between the two terminals.

In one or more embodiments, the QUIC communication between the two terminals may be a communication over multiple paths, or potentially may become so by means of the proxy service. In embodiments where a plurality of paths are accessible to the proxy node for the QUIC communication between the first terminal and second terminal, the proxy information message may be interpreted by the second terminal as an offer to use multiple paths, by means of the proxy node, for the QUIC communication with the first terminal. The proxy information message may thus comprise data identifying a proxy node having access to a plurality of paths for the communication between the first terminal and second terminal, as illustrated in FIG. 2d.

In one or more embodiments, the data identifying the proxy node may comprise data identifying the proxy node, such as a proxy node identifier allocated by the first terminal, or a proxy node identifier communicated by the proxy node to the first terminal. The data identifying the proxy node may also comprise data for accessing the proxy node, such as an address of the proxy node (for example an IP address, possibly combined with a port number). These data for accessing the proxy node may correspond to access data communicated by the proxy node to the first terminal. The data identifying the proxy node may further comprise one or more QUIC connection identifiers, for example in the form of a list of one or more QUIC connection identifiers. Finally, the data identifying the proxy node may further comprise a "Challenge" and a token which are identical to those communicated by the first terminal to the proxy node.

Upon receiving the proxy information message, the second terminal may refuse to use the proxy services identified in the proxy information message, implicitly or explicitly depending on the chosen embodiment.

An explicit refusal may be communicated to the first terminal by sending a refusal message concerning the use of the proxy node for communication with the first terminal. In one or more embodiments, the refusal message is a QUIC message (for example introduced under the name "PATH_PROBE_REJECT") informing the first terminal of the refusal by the second terminal to use the proxy node. This refusal message may, in one embodiment, comprise an identifier of the proxy node in order to distinguish the proxy node concerned by the message in the event of a possible use of several proxy nodes, for example corresponding to a proxy node identifier received by the second terminal in the proxy information message.

In the case of an explicit refusal communicated to the first terminal, the first terminal may receive, originating from the second terminal, a refusal message in the communication established according to the QUIC protocol concerning the use of a proxy, comprising data indicating a refusal by the second terminal to use the proxy node for communication with the first terminal. In one embodiment, the data indicating a refusal to use the proxy node may comprise proxy node identification data corresponding to proxy node identification data sent by the first terminal in the proxy information message.

Conversely, upon receiving the proxy information message, the second terminal may accept the use of the services of the proxy identified in the proxy information message, implicitly or explicitly depending on the chosen embodiment.

The explicit acceptance may be communicated to the first terminal by sending an acceptance message concerning the use of the proxy node for the communication with the first terminal. In one or more embodiments, the acceptance message is a QUIC message (for example called "PATH_PROBE_ACCEPT") communicating to the first terminal the acceptance by the second terminal of the use of the proxy node. This acceptance message may, in one embodiment, comprise a proxy node identifier in order to distinguish the proxy node concerned by the message in the event of a possible use of several proxy nodes, for example corresponding to a proxy node identifier received by the second terminal in the proxy information message.

In the case of an explicit acceptance communicated to the first terminal, the first terminal may receive, originating from the second terminal, a message in the communication established according to the QUIC protocol concerning acceptance of the use of a proxy, comprising data indicating acceptance by the second terminal of the use of the proxy node for the communication with the first terminal. In one embodiment, the data indicating acceptance of the use of the proxy node may comprise proxy node identification data corresponding to proxy node identification data sent by the first terminal in the proxy information message.

Figure 3B:
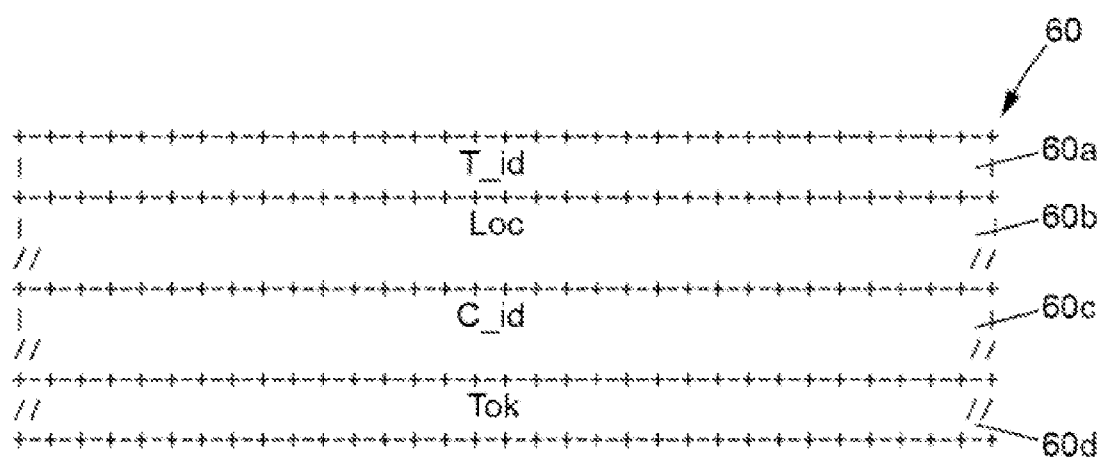
FIG. 3b illustrates a QUIC proxy information frame according to one or more embodiments.

Thus, in one or more embodiments, the first terminal (T1) (or local terminal) communicates the identity of the proxy in a possibly encrypted QUIC message to the second terminal (or remote terminal) (T2), for example by means of a new QUIC proxy information frame, for example called "PATH_PROBE_TARGET", of which one possible structure is illustrated by FIG. 3b.

As illustrated in FIG. 3b, the new QUIC frame (60) proposed for the proxy information may comprise, depending on the embodiments, one or more of the following fields:

A first field (60a), called "Target_Id", which carries a proxy identifier, for example allocated by the terminal sending the proxy information message in order to identify the proxy node that is the object of the message.

A second field (60b), called "Locator(s)", which carries one or more locator(s) for reaching the proxy node. Depending on the embodiment, a locator may for example be an IPv4 address, an IPv6 address, or an IP address and a port number. In one embodiment, this field corresponds to a copy of the "Locator(s)" field of the PROXY_SERVICE_OFFER UDP option transmitted by the proxy node to the first terminal.

A third field (60c), called "Connection_ID(s)", which describes a list containing one or more connection identifiers whose path involves the proxy node.

A fourth field (60d), called "Token", which describes a key identical to the one communicated to the proxy node in a proxy use acceptance message sent by the first terminal to the proxy node.

A fifth field (60e), called "Challenge", which describes a challenge identical to the one communicated to the proxy node in a proxy use acceptance message sent by the first terminal to the proxy node.

The terminal may also include the identity of the proxy when creating new connection identifiers. To do so, the NEW_CONNECTION_ID frame is modified to associate a proxy with a connection identifier. The frame is modified to specify the identifier (or identifiers) of proxy nodes capable of being involved when new connection identifiers are used.

FIG. 2g shows an example of a NEW_CONNECTION_ID frame modified to associate a proxy with a connection identifier.

In one embodiment, the PROXY_SERVICE_ACCEPT option may be included in the same QUIC message as the one transporting the PATH_PROBE_TARGET frame.

Referring to FIG. 3a, in one or more embodiments, the second terminal T2 (50b) may be configured, upon receiving the proxy information message and data identifying the proxy node, to save in a table (53, "MP_PEER_TBL" table), for example stored in the memory of said terminal, the data identifying the proxy node received. When the data identifying the proxy node comprise proxy node identification data, data for accessing the proxy node in the associated communication network, a first list of connection identifiers whose path involves the proxy node, a "Challenge", and a "Token", the MP_PEER_TBL table can be configured to store the proxy node identification data in association with the data for accessing the proxy node in the associated communication network, a second list of associated connection identifiers established on the basis of the first list of connection identifiers whose path involves the proxy node, and with the token.

For example, in one or more embodiments, the second terminal T2 (50b) may be configured, upon receiving a QUIC proxy information frame (e.g. "PATH_PROBE_TARGET"), to proceed with the integrity checks specified for the QUIC protocol used, then to extract the contents of the PATH_PROBE_TARGET frame. It may further be configured to save, in a table (e.g. "MP_PEER_TBL"), the identity of the proxy, the associated locators, the "Challenge", and the security key ("Token"), as well as a list of associated connection identifiers.

Thus, in one or more embodiments, the second terminal may be configured to store for the communication the received token and a first quadruplet comprising a source address and port number and a destination address and port number of the proxy information message, and upon detecting, in a subsequent message in the communication originating from the first terminal, a source address different from the source address of the first quadruplet, checking with the proxy node whether the subsequent message has passed through the proxy node, and where appropriate, saving for the communication a second quadruplet comprising the source address and port number and the destination address and port number of the subsequent message. In one or more embodiments, the second quadruplet can be saved while retaining the first quadruplet.

This list is updated with NEW_CONNECTION_ID modified frames received from the first terminal, as illustrated in FIG. 2g.

Embodiments of the proposed method are described below in the non-limiting context in which the proxy service is used in order to make use of multiple paths for a communication, established according to the procedures of the QUIC protocol, between a first terminal and a second terminal.

In one or more embodiments in which a proxy node is used for making use of and managing multiple paths for a communication established according to a QUIC protocol between two terminals, the proxy node may send a proxy service offer message for the management of multiple paths for the QUIC communication (for example in the form of a UDP option (for example "PROXY_SERVICE_OFFER") inserted in a QUIC frame sent by a second terminal (said to be "remote") to a first terminal (said to be "local")), to the local terminal, and in return receive acceptance data from the local terminal (for example a UDP option (for example "PROXY_SERVICE_ACCEPT") inserted in a QUIC frame sent to the remote terminal) for use by the proxy for the management of multiple paths for the QUIC communication between the local terminal and the remote terminal, the acceptance data comprising validation data (for example a token or a digital key). Upon receiving the acceptance data, the proxy node may extract the validation data therefrom, and save them in a memory, for example in the form of a table (for example called "PROXY_SERVICE_PEERS") of active connections for the local terminal.

The local terminal may then send to the remote terminal a QUIC frame of information concerning the proxy node (for example "PATH_PROBE_TARGET") comprising information data about the proxy node, the information data comprising data identifying the proxy node, access data for the proxy node, and the acceptance data (for example the "Challenge" or the token) previously communicated to the proxy node. Upon receiving the QUIC frame of information concerning the proxy node, the remote terminal may record in a memory the information data concerning the proxy node that are received from the local terminal, for example in the form of a table (for example called "MP_PEER_TABLE").

In one or more embodiments, the operations of multiple path management and address verification will not take place directly between the two terminals for these connection identifiers but between the terminal and the proxy node according to the information recorded in the table of active connections that is maintained by the proxy node.

In one or more embodiments, in the event of detecting a new path (e.g. a QUIC message comprising a quadruplet {source address, source port, destination address, destination port}), the remote terminal consults its table (MP_PEER_TABLE) in order to retrieve the identity and locator(s) of the associated proxy. Then, the remote terminal sends a message PATH_PROBE_REQUEST (Request_ID, [Peer ID, Connection_ID, External IP address, External port number, Challenge . . . ]) whose destination address is a locator of the proxy. The QUIC frame PATH_PROBE_REQUEST comprises the request identifier "Request_ID", and optionally one or more of the following parameters: "Peer ID", "Connection_ID", "External IP address", "External port number", and a "Challenge" extracted from the table MP_PEER_TABLE. The "Request_ID" field indicates a PATH_PROBE_REQUEST request identifier. This field is used to correlate a request and the associated response. The "Peer ID" field is an optional field which indicates the proxy identifier (Relay_ID) as previously communicated by a remote terminal. The "Connection-ID" field is an optional field which indicates the identifier of the connection relayed by a proxy. The "External IP address" field is an optional field which specifies the source IP address of messages received directly from the terminal (i.e. with no proxy). The "External port number" field is an optional field which specifies the source port number of messages received directly from the terminal.

The challenge included by the remote terminal in a PATH_PROBE_REQUEST ( ) request is identical to the one communicated beforehand by the source terminal. Alternatively, the challenge is composed of one or more parameters such as the external IP address and "Challenge" or the external IP address and "Connection_ID". The included challenge can thus be structured according to the following form: "parameter1% parameter2% . . . ". "%" is used as a separator. In the following, the term "challenge" is used with reference to the "Challenge" field or to that of the variant.

In one or more embodiments, upon the reception of the PATH_PROBE_REQUEST frame by the proxy node, the node checks whether an entry associated with this request is present in its table of active connections for the local terminal (PROXY_SERVICE_PEERS).

In one or more embodiments, if an entry is present, the proxy node extracts the associated validation data, for example the associated token ("Token"), and includes it in a PATH_PROBE_REPLY message returned to the remote terminal, as well as the request identifier ("Request_ID") extracted from the received PATH_PROBE_REQUEST frame. The PATH_PROBE_REPLY QUIC frame comprises the request identifier "Request_ID", and optionally one or more of the following parameters: "Code" and "Token". The "Code" field indicates the result of the query.

In one or more embodiments, if no entry was found, the proxy node may respond with a PATH_PROBE_REPLY (Error_Code=Not Found) error message. It is also possible that the proxy node ignores the request.

In one or more embodiments, upon receiving the PATH_PROBE_REPLY message, the remote terminal compares the token received in the response with the one maintained in its MP_PEER_TABLE table. The path is not validated if an anomaly is detected during the token verification operation.

For any validated path, the remote terminal can then use the associated resources and does not proceed with connection migration.

Thus, in one or more embodiments, the proposed method may further comprise, during establishment of the communication between the first terminal and the second terminal or at any other time in the communication, indicating to the first terminal that the second terminal supports an extension of the QUIC protocol which allows establishing communications according to the QUIC protocol over multiple paths, even if only one path is locally available at the second terminal.

In one or more embodiments, the verification performed by the second terminal may comprise: sending a verification request message to the proxy node comprising the source address from the second quadruplet or a challenge; receiving a response message from the proxy node comprising a token, and verifying that the token received from the proxy node matches the stored token.

In one or more embodiments, the second terminal may further be configured, if the two tokens match, to use the second quadruplet for sending encrypted messages to the first terminal.

Figure 4A:
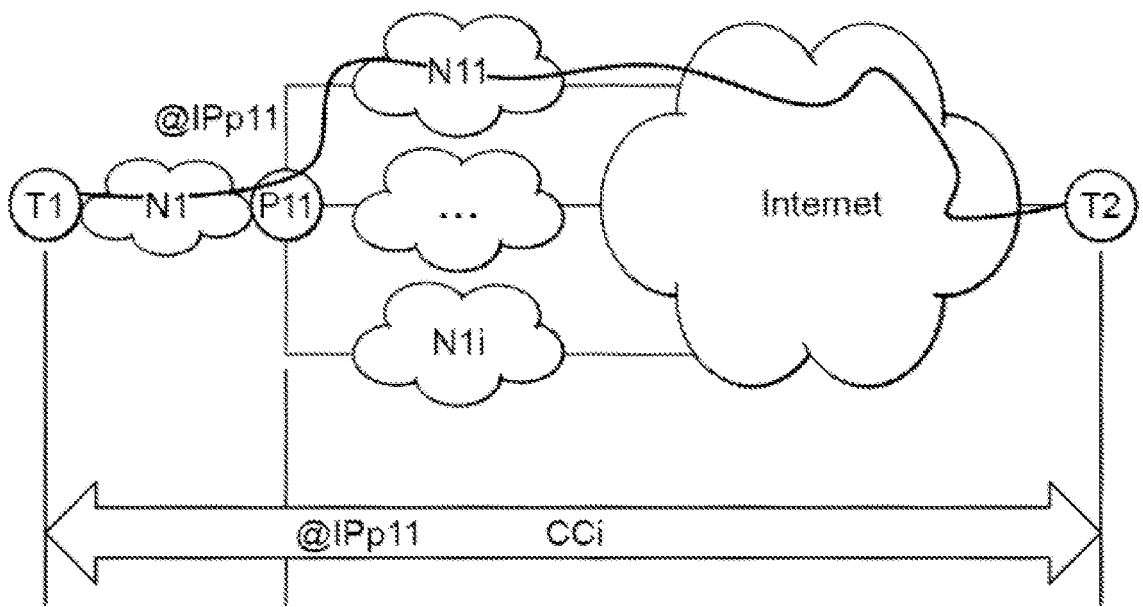
FIG. 4a illustrates an exemplary establishment of an initial path taken by a QUIC communication according to one or more embodiments.
Figure 4B:
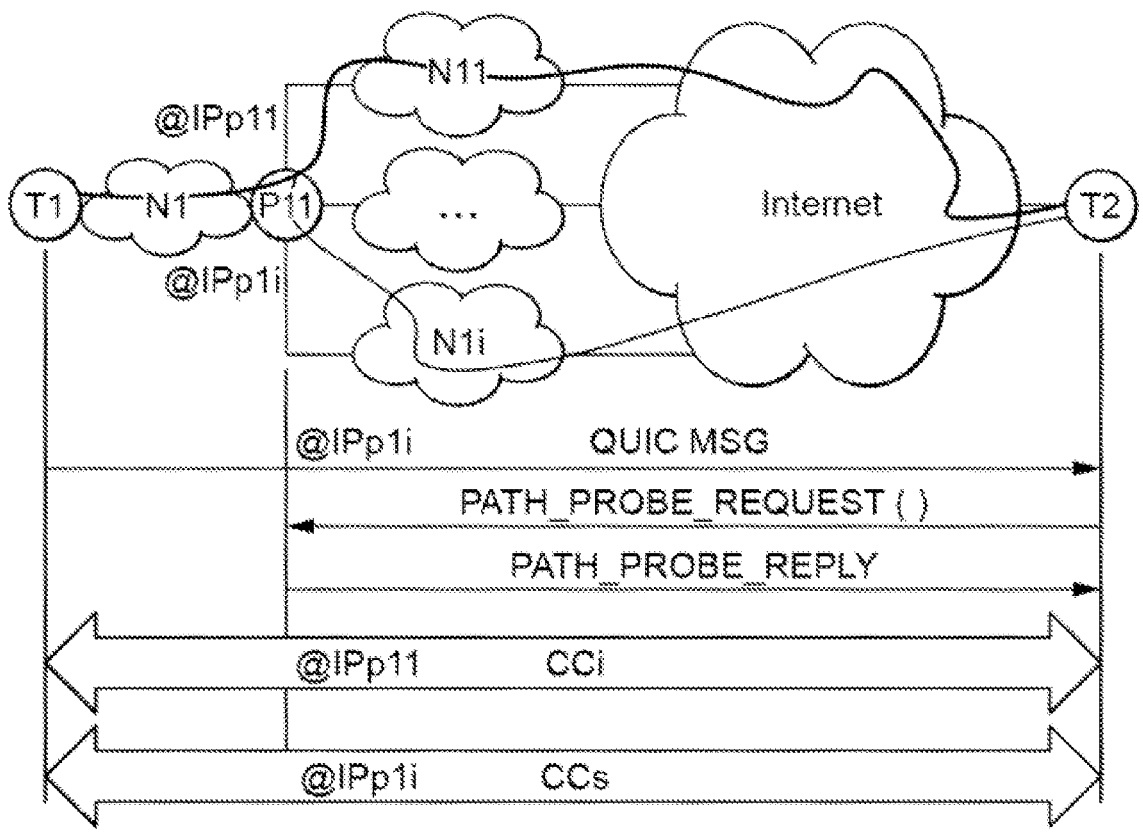
FIG. 4b illustrates an exemplary establishment of an initial path and secondary path taken by a QUIC communication according to one or more embodiments.

The use of multiple paths according to the proposed method is illustrated in an exemplary implementation in FIGS. 4a and 4b.

Figure 5A:
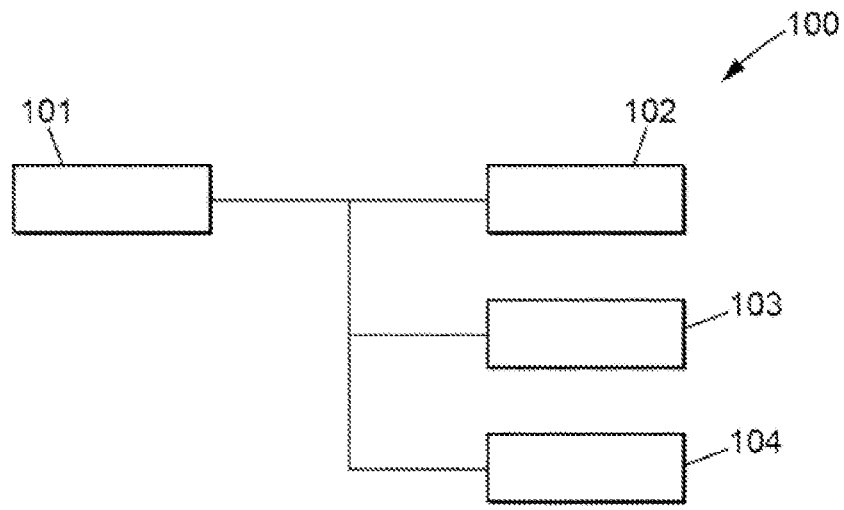
FIG. 5a illustrates an exemplary architecture of a terminal according to one or more embodiments.
Figure 5B:
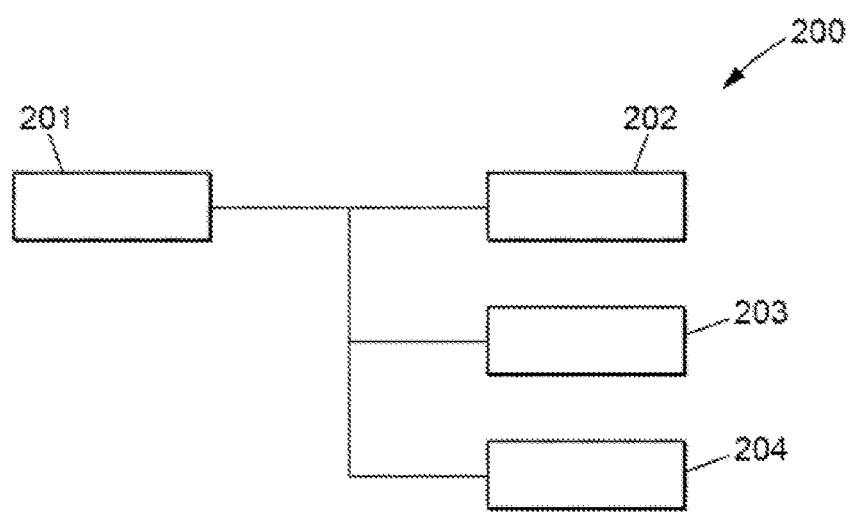
FIG. 5b illustrates an exemplary architecture of a proxy node according to one or more embodiments.

FIG. 4a shows an exemplary establishment of a communication according to the QUIC protocol between a local terminal (T1) and a remote terminal (T2), via a proxy (P11) along an initial communication path (CCi), while FIG. 5b shows an exemplary establishment of a communication according to the QUIC protocol via multiple paths.

With reference to FIG. 4a, the proxy node (P11) uses an address (or a prefix) (@IPp11) allocated by the subnetwork (N11) through which the initial communication path passes. With reference to FIG. 4b, the proxy node (P11) uses two addresses (or prefixes) (@IPp11 and @IPp1i) respectively allocated by the subnetworks (N11) and (N1i) through which the initial communication path (CCi) and the secondary communication path (CCs) pass. The example illustrated in FIG. 4b thus does not involve the local terminal (T1) in the implementation of the QUIC communication via multiple paths.

Those skilled in the art will understand that the example illustrated in FIG. 4b is not limiting, in that the method proposed for making use of multiple paths for a QUIC communication by using a proxy node is not limited to two paths, or to the use of a single proxy, but can be used for making use of two or more multiple paths for a QUIC communication between two terminals while using one or more proxy nodes.

FIG. 5a illustrates an exemplary architecture of a terminal for implementing the proposed method.

With reference to FIG. 5a, the device 100 comprises a controller 101, operatively coupled to a communication interface 102 and to a memory 103, which controls a module for managing communications according to a QUIC protocol 104.

The communication interface 102 comprises one or more communication units, each configured to send and/or receive data according to one or more data communication protocols (wired or wireless), for example WLAN, Ethernet, UMTS, LTE, or LTE-A.

The controller 101 is configured to control the communications management module 104 and the communication interface 102 to implement one or more embodiments of the proposed method.

The communications management module 104 is configured for the implementation of the proposed method by a terminal. In particular, the communications management module 104 can be configured to perform the functions and carry out the actions described herein for the implementation of the proposed method by a terminal (local and/or remote). In one or more embodiments, the communications management module 104 is configured to send, to another terminal, a proxy information message in a communication established according to QUIC with the other terminal, the proxy information message comprising data identifying a proxy node that is usable for the communication with the first terminal; and to receive, originating from another terminal, such a proxy information message.

The device 100 may be a computer, a computer network, an electronic component, or some other device comprising a processor operatively coupled to a memory, as well as, depending on the embodiment chosen, a data storage unit, and other associated hardware elements such as a network interface and a media drive for reading and writing a removable storage medium (not shown in the figure). The removable storage medium may be, for example, a compact disc (CD), a digital video/versatile disc (DVD), a flash disc, a USB stick, an SSD memory, etc. Depending on the embodiment, the memory, the data storage unit, or the removable storage medium contains instructions which, when executed by the controller 101, cause this controller 101 to perform or control the communications management module 104 and communications interface 102 portions of the exemplary implementations of the proposed method described herein. The controller 101 may be a component implementing a processor or a computing unit for managing communications according to the proposed method and for controlling units 102 and 104 of the device 100.

The device 100 may be implemented in software form, in hardware form, such as an application-specific integrated circuit (ASIC), or as a combination of hardware and software elements, for example such as a software program intended to be loaded and executed on an FPGA (Field Programmable Gate Array) type of component. Similarly, the communications management module 104 may be implemented in software form, in hardware form, such as an ASIC, or as a combination of hardware and software elements, for example such as a software program intended to be loaded and executed on an FPGA type of component.

FIG. 5b illustrates an exemplary architecture of a proxy node for implementing the proposed method.

With reference to FIG. 5b, the device 200 comprises a controller 201, operatively coupled to a communication interface 202 and to a memory 203, which controls a QUIC proxy service module 204.

The communication interface 202 comprises one or more communication units, each configured to send and/or receive data according to one or more data communication protocols (wired or wireless), for example WLAN, Ethernet, UMTS, LTE, LTE-A.

The controller 201 is configured to control the proxy service module 204 and the communication interface 202 for the implementation of one or more embodiments of the proposed method.

The proxy service module 204 is configured for the implementation of the proposed method by a proxy node. In particular, the proxy service module 204 can be configured to perform the functions and carry out the actions described herein for the implementation of the proposed method by a proxy node.

The device 200 may be a computer, a computer network, an electronic component, or some other device comprising a processor operatively coupled to a memory, as well as, depending on the embodiment chosen, a data storage unit, and other associated hardware elements such as a network interface and a media drive for reading and writing a removable storage medium (not shown in the figure). The removable storage medium may be, for example, a compact disc (CD), a digital video/versatile disc (DVD), a flash disc, USB stick, an SSD memory, etc. Depending on the embodiment, the memory, the data storage unit, or the removable storage medium contains instructions which, when executed by the controller 201, cause this controller 201 to perform or control the proxy service module 204 and communication interface 202 portions of the exemplary implementations of the proposed method described herein. The controller 201 may be a component implementing a processor or a computing unit for managing communications according to the proposed method and for controlling units 202 and 204 of the device 200.

The device 200 may be implemented in software form, in hardware form, such as an application-specific integrated circuit (ASIC), or as a combination of hardware and software elements, for example such as a software program intended to be loaded and executed on a FPGA (Field Programmable Gate Array) type of component. Similarly, the proxy service module 204 may be implemented in software form, in hardware form, such as an ASIC, or as a combination of hardware and software elements, for example such as a software program intended to be loaded and executed on a FPGA type of component.

INDUSTRIAL APPLICATION

Depending on the embodiment chosen, certain acts, actions, events, or functions of each of the methods described in this document may be carried out or occur in a different order from that in which they have been described, or may be added, merged, or may not be carried out or occur, depending on the case. Furthermore, in some embodiments, certain acts, actions, or events are carried out or occur concurrently and not sequentially.

Although described via a number of detailed exemplary embodiments, the proposed method and the device for implementing an embodiment of the method comprise various variants, modifications, and improvements which will be evident to those skilled in the art, it being understood that these various variants, modifications, and improvements are within the scope of the present disclosure, as defined by the claims which follow. In addition, various aspects and features described above may be implemented together, or separately, or substituted for one another, and all of the various combinations and sub-combinations of the aspects and features are within the scope of present disclosure. In addition, it may be that certain systems and devices described above do not incorporate all of the modules and functions that have been described for the preferred embodiments.

The invention claimed is:

1. A method of managing a communication established according to the QUIC protocol between a first terminal and a second terminal which are connected via a communication network, the method comprising, at the first terminal:
   discovering at least one proxy node between the first terminal and the second terminal, said proxy node being capable of providing at least one service for said communication; and
   based on the first terminal accepting said service, sending to the second terminal, in an establishment phase or during said communication, an encrypted proxy information message comprising data identifying said at least one proxy node and a token intended to be provided by said at least one proxy node to the second terminal.

2. The method according to claim 1, wherein discovering said at least one proxy node comprises receiving a message originating from the proxy node or originating from the second terminal and having passed through said at least one proxy node, comprising an indication of said service provided by said proxy node and an identifier of said proxy node.

3. The method according to claim 1, further comprising, based on the first terminal accepting the providing of said service by said proxy node, sending a message intended for the proxy node or intended for the second terminal and passing through said proxy node, comprising an indication intended for said proxy node of the acceptance of said service by the first terminal and a token generated by the first terminal.

4. The method according to claim 3, wherein the proxy information message further comprises at least one element among: reachability information of the proxy node enabling access to said proxy node, at least one identifier of at least one communication between the first and the second terminal along a path involving the proxy node, and a challenge generated by the first terminal.

5. The method according to claim 1, comprising verifying the reliability of the proxy node before accepting said service.

6. The method according to claim 1, wherein said service comprises access by the proxy node to multiple paths for supporting said communication between the first terminal and the second terminal.

7. The method according to claim 6, further comprising, based on the first terminal accepting the providing of said service by said proxy node, sending a message intended for the proxy node or intended for the second terminal and passing through said proxy node, comprising an indication intended for said proxy node of the acceptance of said service by the first terminal and a token generated by the first terminal;
   wherein said message further comprises an algorithm for distributing the traffic load between said multiple paths, intended to be applied by the proxy node.

8. The method according to claim 1, comprising, during the establishment of or during said communication between the first and second terminal, indicating to the second terminal that the first terminal supports an extension of the QUIC protocol which allows the establishment of said communication according to the QUIC protocol over multiple paths, even in a case where only one path is locally available at the first terminal.

9. A method of managing a communication established according to the QUIC protocol between a first terminal and a second terminal which are connected via a communication network, the method being implemented by a proxy node of the communication network situated between the first and second terminal, said method comprising:
   upon the proxy node being discovered by the first terminal as a proxy node capable of providing at least one service for said communication, inserting, into at least one message intended for the first terminal, originating from the second terminal and passing through said proxy node, data indicating the support by said proxy node for said service, said data comprising an identifier of the proxy node, and
   receiving, originating from the first terminal, a message in said communication, comprising an indication of acceptance by the first terminal of the service provided by the proxy node and a token generated by the first terminal.

10. The method according to claim 9, wherein said data are comprised in a UDP (User Datagram Protocol) option.

11. The method according to claim 10, wherein said service comprises access by the proxy node to multiple paths which allow supporting said communication between the first terminal and the second terminal.

12. The method according to claim 9, wherein said data further comprise at least one among: a service offer identifier, at least one reachability information item of the proxy node enabling access to said proxy node, and descriptive data for the service provided by the proxy node.

13. The method according to claim 9, further comprising:
  storing, in a table of active communications for the first terminal, said token associated with said communication.

14. The method according to claim 9, further comprising, after an acceptance by the first terminal of the service provided by the proxy node, modifying a source or destination address and/or a source or destination port number of a message originating from the first terminal or from the second terminal, intended for the second terminal or for the first terminal and passing through the proxy node which is responsible for relaying said message to the second terminal.

\* \* \* \* \*